United States Patent
Lee et al.

(10) Patent No.: US 9,489,009 B2
(45) Date of Patent: Nov. 8, 2016

(54) SYSTEM ON CHIP, BUS INTERFACE AND METHOD OF OPERATING THE SAME

(71) Applicant: SAMSUNG ELECTRONICS CO., LTD., Suwon-si, Gyeonggi-do (KR)

(72) Inventors: Hee-Seong Lee, Siheung-si (KR); Woo-Jin Kim, Yongin-si (KR); Nak Hee Seong, Gwacheon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 46 days.

(21) Appl. No.: 14/486,434

(22) Filed: Sep. 15, 2014

(65) Prior Publication Data
US 2015/0236870 A1    Aug. 20, 2015

(30) Foreign Application Priority Data
Feb. 20, 2014 (KR) .................. 10-2014-0019742

(51) Int. Cl.
*H04B 7/005* (2006.01)
*G06F 1/12* (2006.01)
*G06F 1/32* (2006.01)

(52) U.S. Cl.
CPC .................. *G06F 1/12* (2013.01); *G06F 1/324* (2013.01)

(58) Field of Classification Search
CPC ......... H04Q 11/0428; H04Q 11/0471; H04Q 11/0478; H04Q 11/08; H04Q 11/06; H04L 12/40013; H04L 12/40019; H04L 12/40026; H04L 12/40032; H04L 2012/40; H04L 12/525; H04L 49/901; G06F 1/12; G06F 1/324

USPC ....... 370/359, 363, 362, 365, 378, 379, 389, 370/371, 278, 282
See application file for complete search history.

(56) References Cited

U.S. PATENT DOCUMENTS

| | | | |
|---|---|---|---|
| 4,569,062 A * | 2/1986 | Dellande | H04L 5/24 370/305 |
| 4,639,861 A | 1/1987 | Appiano et al. | |
| 4,847,867 A | 7/1989 | Nasu et al. | |
| 5,070,443 A | 12/1991 | Priem et al. | |
| 5,079,696 A | 1/1992 | Priem et al. | |
| 5,199,106 A | 3/1993 | Bourke et al. | |
| 5,255,375 A | 10/1993 | Crook et al. | |
| 5,265,216 A | 11/1993 | Murphy et al. | |
| 5,469,547 A | 11/1995 | Pawlowski | |
| 5,509,124 A | 4/1996 | Bourke et al. | |
| 5,592,685 A | 1/1997 | Pawlowski | |

(Continued)

FOREIGN PATENT DOCUMENTS

| | | |
|---|---|---|
| JP | 11-224180 | 8/1999 |
| JP | 2011-065415 | 3/2011 |
| KR | 1020020067752 | 8/2002 |

*Primary Examiner* — Brenda H Pham
(74) *Attorney, Agent, or Firm* — F. Chau & Associates, LLC

(57) ABSTRACT

A mobile system includes a first interface configured to transmit a payload in synchronization with a first clock signal through a first channel at a first transfer rate; and a second interface that includes: a payload storage connected to the first channel and configured to receive the payload from the first channel; and a payload receiver connected to the payload storage and configured to receive the payload from the payload storage in synchronization with a second clock at a second transfer rate through a second channel. A length of the second channel is shorter than a length of the first channel, and the first clock signal is asynchronous with the second clock signal.

13 Claims, 16 Drawing Sheets

(56) References Cited

U.S. PATENT DOCUMENTS

| | | |
|---|---|---|
| 5,768,546 A | 6/1998 | Kwon |
| 6,075,830 A | 6/2000 | Piirainen |
| 6,445,718 B1 | 9/2002 | Muto |
| 6,606,678 B1 | 8/2003 | Nakamura |
| 6,795,882 B1 | 9/2004 | Kommrusch |
| 6,850,092 B2 | 2/2005 | Chelcea et al. |
| 6,978,391 B2 | 12/2005 | Ito et al. |
| 7,286,487 B2 * | 10/2007 | Perkins .................... H04J 3/07 370/253 |
| 7,320,043 B2 | 1/2008 | Shatas et al. |
| 7,366,803 B1 * | 4/2008 | Gaither ................. H04L 12/433 370/363 |
| 7,467,358 B2 | 12/2008 | Kang et al. |
| 7,590,788 B2 | 9/2009 | Dike |
| 7,657,668 B2 | 2/2010 | Escott |
| 7,724,759 B2 | 5/2010 | Bozso et al. |
| 7,783,820 B2 | 8/2010 | Shelton et al. |
| 7,793,021 B2 * | 9/2010 | Priel .................... H04J 3/0685 370/503 |
| 7,840,741 B2 | 11/2010 | Bahren |
| 8,443,122 B2 | 5/2013 | Yun et al. |
| 2003/0088724 A1 | 5/2003 | Itoh et al. |
| 2007/0038795 A1 | 2/2007 | Kadomaru |

* cited by examiner

SYSTEM ON CHIP, BUS INTERFACE AND METHOD OF OPERATING THE SAME

CROSS-REFERENCE TO RELATED PATENT APPLICATION

This application claims priority under 35 U.S.C. §119 to Korean Patent Application No. 10-2014-0019742 filed on Feb. 20, 2014 in the Korean Intellectual Property Office, the disclosure of which is incorporated by reference herein in its entirety.

TECHNICAL FIELD

The present inventive concept relates to a system on chip (SoC), and more particularly, to an asynchronous interface in a SoC and a method of operating the same.

DISCUSSION OF THE RELATED ART

A system on chip (SoC) may integrate various and complex systems on a single chip. For example, as components of a computer, telecommunication devices, broadcasting devices, etc. are converged, an Application Specific Integrated Circuit (ASIC) or an Application Specific Standard Product (ASSP) may be more likely to be implemented by a SoC. Moreover, compact and light mobile devices drivers are being developed in SoC related industries.

A SoC may include a plurality of intellectual properties (hereafter referred to as IPs or function blocks). Each of a plurality of function blocks may perform their own operations. The plurality of function blocks may communicate with each other through a bus in the SoC. For example, the Advanced Microcontroller Bus Architecture (AMBA) bus protocol may be used to connect the plurality of function blocks or IPs through an AMBA bus. AMBA defines several types of bus layers (or protocols), for example, Advanced High Performance Bus (AHB), Advanced Peripheral Bus (APB), Advanced eXtensible Interface (AXI), etc. The AXI bus protocol provides multiple outstanding addressing and data interleaving.

The plurality of function blocks can communicate with each other in a different clock domain or the same clock domain. When the function blocks operate in the same clock domain, they can receive and transmit data synchronously. On the other hand, when they operate in difference clock domains, the function blocks may have additional circuits to receive and transmit data asynchronously.

A long distance between a transmitter and a receiver may result in a long transmission line connected between the transmitter and the receiver. In this case, if the transmitter and the receiver operate in different clock domains, an output signal of a First In First Out (FIFO) memory in the transmitter is lengthened when sent to the receiver for an asynchronous interface to transmit data. A clock signal of the receiver is also lengthened when sent to the transmitter for controlling the FIFO memory in the transmitter. The output signal of the FIFO memory is synchronized with a clock signal in the transmitter to store data in the FIFO memory. However, propagation delays in the output signal of FIFO memory and the clock signal of the receiver which are lengthened may limit the maximum data transfer speed between the transmitter and the receiver.

An asynchronous bridge or register slices may be used as an intermediate block to compensate for the speed reduction between the transmitter and the receiver. However these additional circuits may increase power consumption and design complexity.

SUMMARY

According to an exemplary embodiment of the present inventive concept, a mobile system may include a first interface configured to transmit a payload in synchronization with a first clock signal through a first channel at a first transfer rate and a second interface including a payload storage connected to the first channel and configured to receive the payload from the first channel and a payload receiver connected to the payload storage and configured to receive the payload from the payload storage in synchronization with a second clock at a second transfer rate through a second channel, wherein a length of the second channel is shorter than a length of the first channel, and the first clock signal is asynchronous with the second clock signal.

An enable signal may be transmitted from the first interface to the second interface when the payload is transmitted from the first interface to the second interface through the first channel.

The first interface may include a local write pointer generator configured to increase a local write pointer based on the enable signal and the second interface may include a remote write pointer generator configured to increase a remote write pointer based on the payload or the enable signal received from the first interface.

The first channel may include a first bus line configured to transfer the first clock signal, a second bus line configured to transfer the payload and a third bus line configured to transfer the enable signal, wherein at least one of the first bus line, the second bus line and the third bus line has a length greater than 2000 um.

The first channel may include a first bus line configured to transfer the first clock signal, a second bus line configured to transfer the payload and a third bus line configured to transfer the enable signal, wherein at least one of the first bus line, the second bus line and the third bus line has at least three buffers.

The second interface may transfer an acknowledge signal in synchronization with the second clock signal through a third channel when the payload receiver receives the payload from the payload storage through the second channel.

The second interface may include a local read pointer generator configured to increase a local read pointer based on the payload received at the payload receiver and the first interface may include a remote read pointer generator configured to increase a remote read pointer based on the acknowledge signal.

The third channel may include a fourth bus line configured to transfer the second clock signal and a fifth bus line configured to transfer the acknowledge signal, wherein at least one of the fourth bus line and the fifth bus line has a length greater than 2000 um.

The third channel may include a fourth bus line configured to transfer the second clock signal and a fifth bus line configured to transfer the acknowledge signal, wherein at least one of the fourth bus line and the fifth bus line has at least three buffers.

According to an exemplary embodiment of the present inventive concept, an intellectual property (IP) module may include a first channel configured to receive a payload in synchronization with a first clock signal having a first frequency, a payload storage configured to store the payload in synchronization with the first clock signal, a second channel configured to receive the payload from the payload storage, a payload receiver configured to receive the payload in synchronization with a second clock signal through the second channel and a third channel configured to transmit the second clock signal and an acknowledge signal in synchronization with the second clock signal received from the payload receiver.

The payload receiver may receive a write enable signal of the payload through the first channel. The write enable signal may correspond to a write data valid signal according to an Advanced eXtensible Interface (AXI) bus protocol.

The acknowledge signal may correspond to a write data ready signal according to the AXI bus protocol.

According to an exemplary embodiment of the present inventive concept, a system on chip may include a first interface, a second interface, a third interface, a first channel connected between the first interface and the second interface, a second channel connected between the first interface and the third interface, and a clock channel having a first clock signal connected between the first interface and at least one of the second interface and the third interface, a second clock signal connected between the first interface and the second interface, and a third clock signal connected between the first interface and the third interface.

The system on chip may further include a first master IP connected to the first interface, a first slave IP connected to the second interface and a second slave IP connected to the third interface.

The first channel and the second channel may operate according to a communication protocol based on the AXI bus protocol.

A first data signal and a first enable signal may be transmitted from the first interface to at least one of the second interface and the third interface in synchronization with the first clock signal.

A second data signal and a second enable signal may be transmitted from the second interface to the first interface in synchronization with the second clock signal, or a third data signal and a third enable signal may be transmitted from the third interface to the first interface in synchronization with the third clock signal.

A first acknowledge signal may be transmitted from the first interface to at least one of the second interface and the third interface in synchronization with the first clock signal.

A second acknowledge signal may be transmitted from the second interface to the first interface in synchronization with the second clock signal, or a third acknowledge signal may be transmitted from the third interface to the first interface in synchronization with the third clock signal.

The first interface may include a local write pointer generator, and at least one of the second interface and the third interface may include a remote write pointer generator.

At least one of the second interface and the third interface may include a local read pointer generator and the first interface may include a remote read pointer generator.

When a frequency of the first clock signal is equal to or larger than 500 Mhz, a length of the first channel may be greater than 2000 μm.

According to an exemplary embodiment of the present inventive concept, a bus interfacing method of a system on chip may include transmitting a payload from a first interface to a buffer memory in a second interface at a first transfer rate through a first channel in synchronization with a first clock signal and transmitting the payload from the buffer memory to a payload receiver at a second transfer rate through a second channel that is asynchronous with the first channel, wherein the first channel has a larger length than the second channel.

The buffer memory may be a first in first out (FIFO) memory.

The bus interfacing method of a system on chip may further include transmitting an enable signal of the payload from the first interface to the second interface at the first transfer rate through the first channel in synchronization with the first clock signal.

The bus interfacing method of a system on chip may further include transmitting a second clock signal and an acknowledge signal in synchronization with the second clock signal at the second transfer rate from the second interface to the first interface through a third channel.

The bus interfacing may be performed based on the AXI bus protocol.

When a frequency of the first clock is equal to or larger than 500 Mhz, a length of the first channel may be greater than 2000 um.

According to an exemplary embodiment of the present inventive concept, a bus interfacing circuit may include a transmitter interface configured to transmit a payload, a write enable signal and a transmitter clock signal through a first channel and a receiver interface including a FIFO memory configured to store the payload based on a remote write pointer generated by the receiver interface based on the write enable signal and a payload receiver configured to read the payload from the FIFO memory, wherein the receiver interface transmits a receiver clock and an acknowledge signal through a second channel, and a length of the second channel corresponds to a length of the first channel.

The payload may be transmitted from a memory component to the transmitter interface.

The payload receiver may be connected to a memory controller that is configured to control the memory component.

The payload may be latched and transmitted to the receiver interface in synchronization with the transmitter clock signal.

The payload may be stored in the FIFO memory in synchronization with the transmitter clock signal.

According to an exemplary embodiment of the present inventive concept an asynchronous interface includes a first interface configured to transmit write data, a write enable signal and a transmitter clock; and a second interface configured to receive the write data through a first bus line, receive the write enable signal through a second bus line and receive the transmitter clock through a third bus line, wherein the first to third bus lines are included in a long-hop channel, the second interface further configured to generate a recovered transmitter clock by adjusting a clock skew between the write data and the transmitter clock, store the write data in a memory based on the recovered transmitter clock, and asynchronously transmit the write data from the memory to a receiver through a first channel that is shorter than the long-hop channel.

The first interface is further configured to receive a receiver clock and a first read acknowledge signal from the second interface through the long-hop channel, generate a recovered receiver clock by adjusting a clock skew between the first read acknowledge signal and the receiver clock, generate a second read acknowledge signal in synchronization with the recovered receiver clock based on the first read acknowledge signal and generate a read increment signal based on the second read acknowledge signal in synchronization with the recovered receiver clock, and asynchronously transmit the read increment signal to a transmitter through a second channel that is shorter than the long-hop channel.

BRIEF DESCRIPTION OF THE DRAWINGS

The above and other features of the present inventive concept will become more apparent by describing in detail exemplary embodiments thereof with reference to the accompanying drawings in which.

DETAILED DESCRIPTION OF THE EMBODIMENTS

Figure 1:
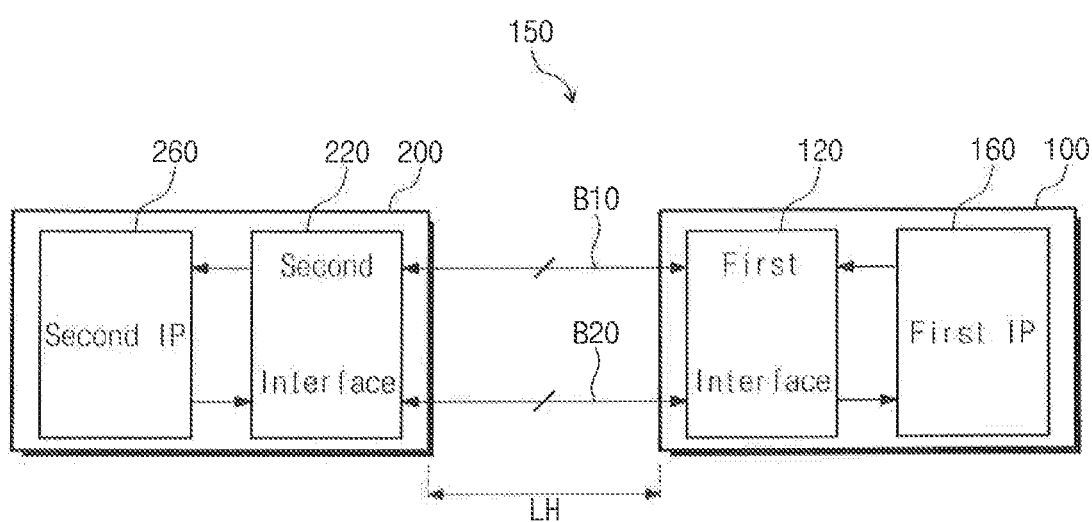
FIG. 1 is a block diagram of a system on chip (SoC) according to an exemplary embodiment of the present inventive concept.

Various exemplary embodiments of the present inventive concept will be described more fully hereinafter with reference to the accompanying drawings. The present inventive concept may, however, be embodied in many different forms and should not be construed as being limited to the embodiments set forth herein. In the drawings, the sizes and relative sizes of layers and areas may be exaggerated for clarity. Like numerals may refer to like elements throughout the specification and drawings.

FIG. 1 is a block diagram of a system on chip (SoC) according to an exemplary embodiment of the present inventive concept. Referring to FIG. 1, a SoC 150 includes a transmitter circuit 100 and a receiver circuit 200 as function blocks in the SoC 150. Here, the transmitter circuit 100 and the receiver circuit 200 transmit or receive data, e.g., payloads.

The transmitter circuit 100 may include a first intellectual property (IP) 160 as a slave IP and a first interface 120 as an asynchronous master interface, and the receiver circuit 200 may include a second IP 260 as a master IP and a second interface 220 as an asynchronous slave interface. On the other hand, the first IP 160 of the transmitter circuit 100 may be a master IP and the first interface 120 of the transmitter circuit 100 may be an asynchronous slave interface, and the second IP 260 of the receiver circuit 200 may be a slave IP and the second interface 220 of the receiver circuit 200 may be an asynchronous master interface.

Although the first IP 160 and the second IP 260 may be defined as a slave IP and a master IP respectively, the first IP 160 and the second IP 260 can be defined as a master IP and a slave IP respectively according to the direction of data transfer. In other words, in FIG. 1, the first IP 160 can be defined as a provider to provide data and the second IP 260 can be defined as a consumer to receive the data.

One or more channels may be connected between the first interface 120 and the second interface 220. For the sake of convenient explanation, the following description will focus on two channels B10 and B20 connected between the first interface 120 and the second interface 220 in FIG. 1.

A first channel B10 between the first interface 120 and the second interface 220 may include a plurality of bus lines to transmit a payload, a write enable signal and a transmitter clock signal between the first interface 120 and the second interface 220. The first channel B10 may further include a plurality of bus lines to transmit a read acknowledge signal and a receiver clock signal between the first interface 120 and the second interface 220.

A second channel B20 similar to the first channel B10 may include a plurality of bus lines to transmit a payload, a write enable signal, a read acknowledge signal, a transmitter clock signal and a receiver clock signal between the first interface 120 and the second interface 220.

The length of long-hop channel LH for the first channel B10 and the second channel B20 between the first interface 120 and the second interface 220 in the SoC 150 may increase as the size of the SoC 150 increases. An asynchronous bridge or a register slice inserted in the middle of the transmission line can avoid a timing violation of a clock signal or a payload, but can increase circuit complexity and power consumption due to additional circuits. In other words, less circuits for transmission through the long channel (hereafter referred to as the long-hop channel) between the first interface 120 and the second interface 220 may increase power efficiency and reduce design complexity.

A routing length of the long-hop channel may be defined based on an operating frequency of the signals delivered between the transmitter circuit 100 and the receiver circuit 200. For example, the minimum routing length of the long-hop channel may be defined to be larger than 2000 um when the operating frequency is larger than 500 Mhz. The larger the operating frequency is, the less the minimum routing length of the long-hop channel may be. In addition, the routing length of the long-hop channel in the SoC 150 may be larger than ½ or ⅔ the length of the longer direction of the vertical direction or the horizontal direction of the chip size of the SoC 150. In some cases, the routing length of the long-hop channel may be larger than 500 um when the operating frequency between the transmitter circuit 100 and the receiver circuit 200 is over 1 GHz. Further, the relationship among the length, the operating frequency of the long-hop channel and the routing length can vary according to semiconductor process characteristics such as low power and high performance.

Figure 2:
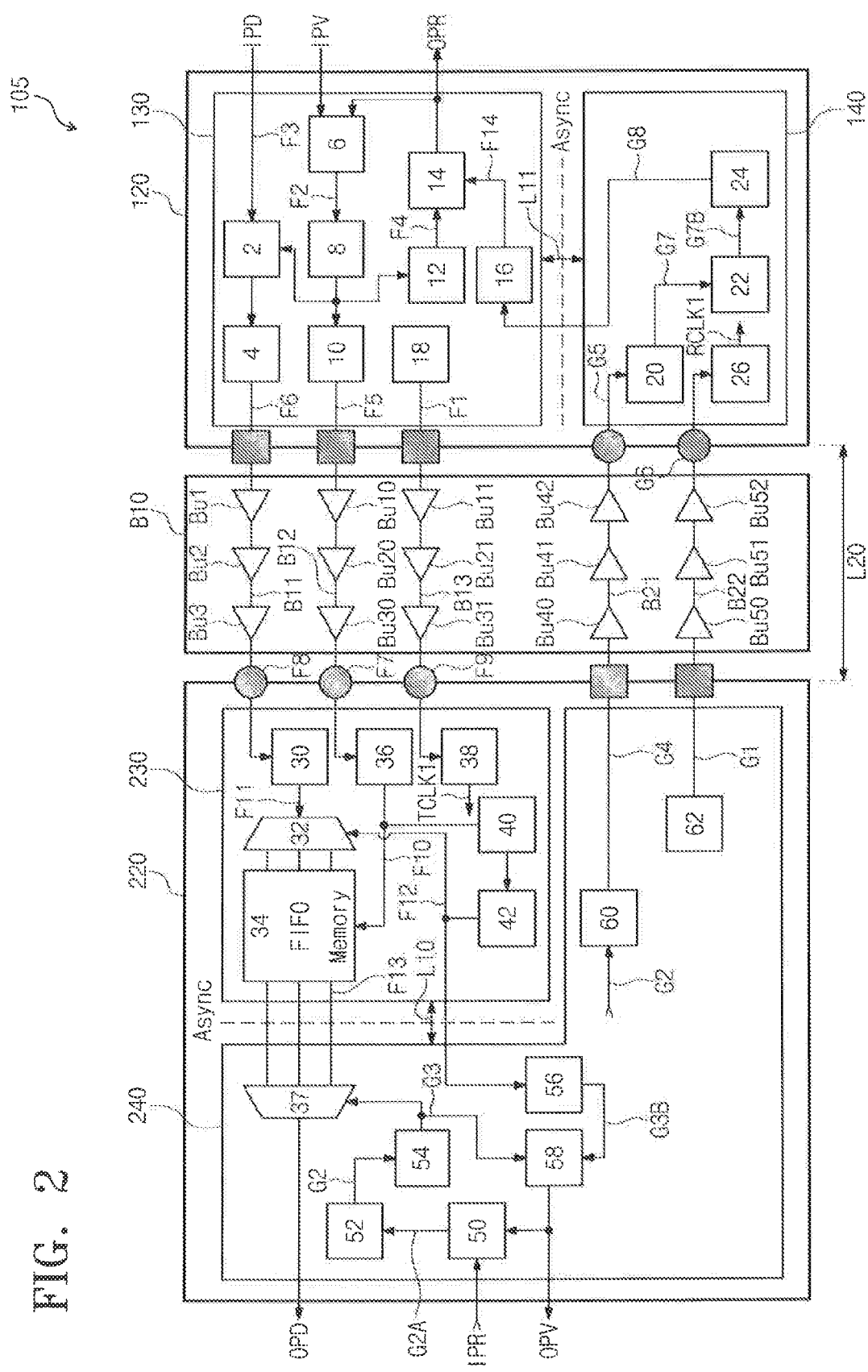
FIG. 2 is a block diagram of an asynchronous interface circuit according to an exemplary embodiment of the present inventive concept.

According to an exemplary embodiment of the present inventive concept in FIG. 2, an asynchronous interface can increase performance while lowering power consumption compared to an asynchronous circuit with additional intermediate circuits in a long channel in a SoC.

FIG. 2 is a block diagram of an asynchronous interface circuit 105 according to an exemplary embodiment of the present inventive concept. Referring to FIGS. 1 and 2, the asynchronous interface circuit 105 includes a first interface 120 and a second interface 220.

For the sake of convenient explanation, the following description will focus on a long-hop channel LH made by the first channel B10 between the first interface 120 and the second interface 220 in FIG. 1. A channel B10 as a long-hop channel L20 in FIG. 2 may correspond to the first channel B10 as the long-hop channel LH in FIG. 1.

Referring to FIG. 2, the first channel B10 may include a first bus line B11, a second bus line B12, a third bus line B13, a fourth bus line B21 and a fifth bus line B22.

Referring to FIG. 2, an Input Payload Data (IPD) signal and an Input Payload Ready Valid (IPV) signal may be inputted to the first interface 120. The first interface 120 may output an Output Payload Ready (OPR) signal. The IPD signal may input payload data to a transmitter 130 in the first interface 120. The IPV signal may be a valid signal that indicates validity of the IPD signal. The OPR signal may be a ready signal that indicates a ready state of the second interface 220 to receive payload data.

The second interface 220 may output an Output Payload Data (OPD) signal and an Output Payload Ready Valid (OPV) signal. An Input payload Ready (IPR) signal may be inputted to a payload receiver 240 in the second interface 220. The OPD signal may be output payload data. The OPV signal may be a valid signal that indicates validity of the OPD signal. The IPR signal may be a ready signal that indicates the payload receiver 240 is in a ready state to receive the OPD signal.

The first interface 120 that operates as an interface for the data provider may include the transmitter 130 and a receiver 140. The second interface 220 that operates as an interface for the data consumer may include a payload storage 230 and the payload receiver 240.

The transmitter 130 in the first interface 120 may include a payload input unit 2, a flip-flop 4, a gating unit 6, an output control signal generator 8, a flip-flop 10, a local write pointer generator 12, a comparator 14, a synchronizer 16 and a transmitter clock generator 18. The transmitter 130 may transmit payloads to the second interface 220.

The payload input unit 2 may receive payload data F3 from the IPD signal and transmit the received payload data to the flip-flop 4.

The flip-flop 4 may store the payload data F3 received from the payload input unit 2. The flip-flop 4 may output the latched payload data as a write data output signal (O_WDATA) F6. The second interface 220 may receive a write data input signal (I_WDATA) F8 obtained from the write data output signal (O_WDATA) F6 in the first interface 120 through the first bus line B11.

The gating unit 6 may generate a write indication signal (WPTR_IND) F2 which indicates that a payload data is inputted from the IPD signal when the IPV signal and the OPR signal are both active. The gating unit 6 may be embodied in an AND logic gate.

The output control signal generator 8 may generate an increment signal (WPTR_INC) to increase a local write pointer F4.

The local write pointer generator 12 may output the local write pointer F4 generated in the transmitter 130 and increase the local write pointer F4 when the increment signal (WPTR_INC) is active.

The flip-flop 10 may latch the increment signal and output the latched increment signal as a write enable output signal (O_WEN) F5 that is transmitted to the payload storage 230 in the second interface 220 through the second bus line B12.

The synchronizer 16 may latch a remote read pointer G8 received from the receiver 140 in synchronization with a transmitter clock output signal (O_TCLK) F1 in the transmitter 130 and output a synchronized remote read pointer F14. The synchronizer 16 may be embodied in a group of latches or flip-flops.

The comparator 14 may compare the local write pointer F4 and the synchronized remote read pointer F14 and generate the OPR signal. The OPR signal may indicate whether a FIFO memory 34 that is in the second interface 220 and is located far away from the first interface 120 is full or not.

The transmitter clock generator 18 may generate the transmitter clock output signal (O_TCLK) F1 which is transmitted to the second interface 220 from the first interface 120 through the third bus line B13. The transmitter clock output signal (O_TCLK) F1 may be provided from the first IP 160 in FIG. 1 and the transmitter clock generator 18 may deliver the transmitter clock output signal (O_TCLK) F1 to the second interface 220.

The receiver 140 in the first interface 120 may include a flip-flop 20, an enable signal generator 22, a remote read pointer generator 24 and a clock recovery unit 26.

The clock recovery unit 26 may receive a receiver clock input signal (I_RCLK) G6 from the second interface 220 through the fifth bus line B22 and generate a recovered receiver clock RCLK1. The clock recovery unit 26 may output the receiver clock input signal (I_RCLK) G6 as a recovered receiver clock RCLK1 without any modification or output a recovered receiver clock RCLK1 by using a recovery circuit such as a Delay Locked Loop (DLL) or a delay buffer. The clock recovery unit 26 may control a clock skew for clock synchronization between a read acknowledge input signal (I_RACK) G5 and the recovered receiver clock signal RCLK1. Accordingly, the receiver 140 in the first interface 120 may operate in the same clock domain as the clock domain of the payload receiver 240 in the second interface 220 when the long-hop channel L20 is connected between the first interface 120 and the second interface 220.

The flip-flop 20 may receive the read acknowledge input signal (I_RACK) G5 that is transmitted from the second interface 220 to the first interface 120 through the fourth bus line B21. The flip-flop 20 may generate a read acknowledge signal G7 in synchronization with the recovered receiver clock signal RCLK1 based on the read acknowledge input signal (I_RACK) G5.

The enable signal generator 22 may generate a read increment signal G7B based on the read acknowledge signal G7 in synchronization with the recovered receiver clock signal RCLK1.

The remote read pointer generator 24 may generate a remote read pointer G8 generated in the first interface 120 and increase the remote read pointer G8 when the read acknowledge signal G7 is active. The remote read pointer generator 24 may include a plurality of flip-flops to store the remote read pointer G8.

The payload storage 230 may include a flip-flop 30, a selector 32, the FIFO memory 34, a flip-flop 36, a clock recovery unit 38, and a remote write pointer generator 42.

The flip-flop 30 may include a flip-flop to store the write data input signal (I_WDATA) F8 received from the transmitter 130 in the first interface 120 through the first bus line B11 and output latched write data F11.

The selector 32 may choose a target entry of the FIFO memory 34 to write the latched write data F11 based on a remote write pointer F12 generated in the second interface 220. The selector 32 may be embodied in a plurality of logic gates to generate a selection signal to select an entry of the FIFO memory 34.

The flip-flop 36 may latch a write enable input signal (I_WEN) F7 that is a signal delayed through the second bus line B12 obtained from the write enable output signal (O_WEN) F5. The flip-flop 36 may generate a latched write enable signal (WEN_DST) F10 in synchronization with a recovered transmitter clock signal TCLK1 generated in the second interface 220.

The FIFO memory 34 may store the latched write data F11 to an entry selected by the selector 32 when the latched write enable signal (WEN_DST) F10 is active.

The clock recovery unit 38 may receive a transmitter clock input signal (I_TCLK) F9 from the third bus line B13 and generate a recovered transmitter clock signal TCLK1. The clock recovery unit 38 may output the transmitter clock input signal (I_TCLK) F9 as a recovered transmitter clock signal TCLK1 without any modification or output a recovered transmitter clock signal TCLK1 by using a recovery circuit such as DLL or a delay buffer. The clock recovery unit 38 may control a clock skew for clock synchronization between the write data input signal (I_WDATA) F8 and the recovered transmitter clock signal TCLK1. Accordingly, the payload storage 230 in the second interface 220 may operate in the same clock domain as the clock domain of the transmitter 130 in the first interface 120 when the long-hop channel L20 is connected between the first interface 120 and the second interface 220.

The remote write pointer generator 42 may generate the remote write pointer F12 generated in the second interface 220 and increase the remote write pointer F12 when the latched write enable signal (WEN_DST) F10 is active. The remote write pointer generator 42 may include a plurality of flip-flop to store the remote write pointer F12.

The remote write pointer generator 42 may include a logic gate unit 40 to output an increased remote write pointer F12. The remote write pointer generator 42 may latch the increased remote write pointer F12 in synchronization with the recovered transmitter clock signal TCLK1.

The payload receiver 240 in the second interface 220 may include a multiplexer 37, a gating unit 50, an output control signal generator 52, a flip flop 54, a synchronizer 56, a comparator 58, a flip-flop 60 and a receiver clock generator 62.

The multiplexer 37 may select an entry of the FIFO memory 34 based on a local read pointer G3.

The gating unit 50 may generate an indication signal G2A which indicates that the payload receiver 240 reads a selected entry of the FIFO memory 34 through the OPD signal according to the local read pointer G3 when the IPR signal and the OPV signal are both active. The gating unit 50 may be embodied in an AND logic gate.

The output control signal generator 52 may generate an increment signal G2 to increase the local read pointer G3.

The synchronizer 56 may latch the remote write pointer F12 received from the payload storage 230 in synchronization with a payload receiver clock output signal (O_RCLK) G1 in the payload receiver 240 and output a synchronized remote write pointer G3B. The synchronizer 56 may be embodied in a group of latches or flip-flops.

The comparator 58 may compare the local read pointer G3 and the synchronized remote write pointer G3B and generate the OPV signal. The OPV signal may indicate whether the FIFO memory 34 is full or not. The second. IP 260 in FIG. 1 may determine whether to read the FIFO memory 34 or not according to the OPV signal.

The flip-flop 60 may latch the increment signal G2 and output the latched increment signal as a read acknowledge output signal (O_RACK) G4 that is transmitted to the receiver 140 in the first interface 120 through the fourth bus line B21.

The receiver clock generator 62 may generate the payload receiver clock output signal (O_RCLK) G1 which is transmitted to the first interface 120 from the second interface 220 through the fifth bus line B22. The payload receiver clock output signal (O_RCLK) G1 may be provided from the second IP 260 in FIG. 1 and the receiver clock generator 62 may deliver the payload receiver clock output signal G1.

In FIG. 2, the IPD signal in the first interface 120 may be transmitted to the FIFO memory 34 in the second interface 220 through the first bus line B11 that is a long transmission line in the long-hop channel L20. The bus line between the multiplexer 37 and the FIFO memory 34 may be very short compared to the long bus line B11 such that the payload receiver 240 and the payload storage 230 may be located close to each other in a layout of the SoC 150. On the other hand, the first interface 120 and the second interface 220 may be located far from each other in the layout of the SoC 150.

The write enable output signal (O_WEN) F5 in the first interface 120 may be transmitted to the second interface 220 through the second bus line B12 that is a long transmission line in the long-hop channel L20.

The transmitter clock output signal (O_TCLK) F1 in the first interface 120 may be transmitted to the second interface 220 through the third bus line B13 that is a long transmission line in the long-hop channel L20.

The IPD signal may be delayed through a plurality of buffers Bu1, Bu2 and Bu3 on the first bus line B11. The write enable signal F5 may be delayed through a plurality of buffers Bu10, Bu20 and Bu30 on the second bus line B12. The transmitter clock output signal (O_TCLK) F1 may be delayed through a plurality of buffers Bu11, Bu21 and Bu31 on the third bus line B13

The payload storage 230 in the second interface 220 may operate in a different clock domain from the clock domain of the payload receiver 240 in the second interface 220 when a short channel L10 is connected between the payload storage 230 and the payload receiver 240.

The receiver 140 in the first interface 120 may operate in a different clock domain from the clock domain of the transmitter 130 in the first interface 120 when a short channel L11 is connected between the receiver 140 and the transmitter 130.

If a transfer of payloads through the first bus line B11 is performed at a first transfer rate, a transfer of payloads through the short channel L10 may be performed at a second transfer rate. Here, the second transfer rate may be larger or smaller than the first transfer rate.

When the transfer of payloads through the first bus line B11 is performed at the first transfer rate, the write enable output signal (O_WEN) F5 and the transmitter clock output signal (O_TCLK) F1 may be transferred at the first transfer rate.

On the other hand, when the transfer of payloads through the first bus line B11 is performed at the first transfer rate, the read acknowledge output signal (O_RACK) G4 and the payload receiver clock output signal (O_RCLK) G1 may be transferred at the second transfer rate. Here, the second transfer rate may be larger or smaller than the first transfer rate.

A method of asynchronous bus interfacing may include a step of transferring a payload at a first transfer rate from the first interface 120 as a slave interface to the FIFO memory 34 in the second interface 220 as a master interface through the first long-hop channel L20. The method of asynchronous bus interfacing may further include a step of transferring at a second transfer rate the payload from the FIFO memory 34 to the payload receiver 240 in the second interface 220 through the first short channel L10 the length of which is shorter than the first long-hop channel L20.

According to the exemplary embodiment of the present inventive concept described in FIG. 2, the FIFO memory 34 and the multiplexer 37 connected to the FIFO memory 34 are located in the second interface 220 which is a long distance from the transmitter 130 in the first interface 120. Accordingly, when the first IP 160 and the second IP 260 in FIG. 1 operate in different clock domains, the first IP 160 and/or the second IP 260 can transmit a payload in a long channel (e.g., a long-hop channel) in synchronization with a transmitter clock generated from one of the first IP 160 and the second IP 260 that transmits the payload. Here, an acknowledge signal corresponding to the payload is transmitted in synchronization with the receiver clock through the long-hop channel. Therefore, the speed limitation and the complexity of circuits between the first IP 160 and the second IP 260 can be reduced according to the exemplary embodiment of the present inventive concept.

Each of the first interface 120 and the second interface 130 may be embodied in an IP that may be a soft IP module described by a Hardware Description Language (HDL). The description of the HDL may have different levels such as a behavioral level, a register level and a transistor level. The soft IP module can be included in a design library that can be provided from a foundry company or an IP company for top-down design methodology.

An IP that operates as a master may be a Central Processing Unit (CPU), a Direct Memory Access (DMA), a Graphic Processing Unit (GPU), a Video Codec, a Digital Signal Processor (DSP), an Image Signal Processor (ISP) and a display controller supporting a plurality of display related ports such as red, green, blue (RGB), high definition multimedia interface (HDMI), a Display Port, a television (TV)-out, etc. An IP that operates as a slave may be a dynamic random access memory (DRAM) memory controller, a static random access memory (SRAM) memory controller and a plurality of IP Special Function Register (SFR) and Peripherals such as universal asynchronous receiver/transmitter (UART), inter-integrated circuit (I2C), integrated interchip sound (I2S), Sony/Philips digital interface format (SPDIF), etc.

Each of the flip-flops 4, 10 and 60 may be used for reducing a skew during each of the transfer of the write data output signal (O_WDATA) F6, the write enable output signal F5, and the read acknowledge output signal (O_RACK) G4. Here, the skew can be maintained less than one cycle of the transmitter clock output signal (O_TCLK) F1.

According to the exemplary embodiment of the present inventive concept described in FIG. 2, at least one of the bus lines B11, B12, B13, B21 and B22 may have at least three buffers on the bus lines B11, B12, B13, B21 and B22. But, the number of buffers on the bus lines B11, B12, B13, B21 and B22 may be changed according to the length or the capacitance of the bus lines B11, B12, B13, B21 and B22. For example, the number of buffers on the bus lines B11, B12, B13, B21 and B22 may be greater than three.

The present inventive concept is not limited to the signals and the components in FIG. 2.

Figure 3:
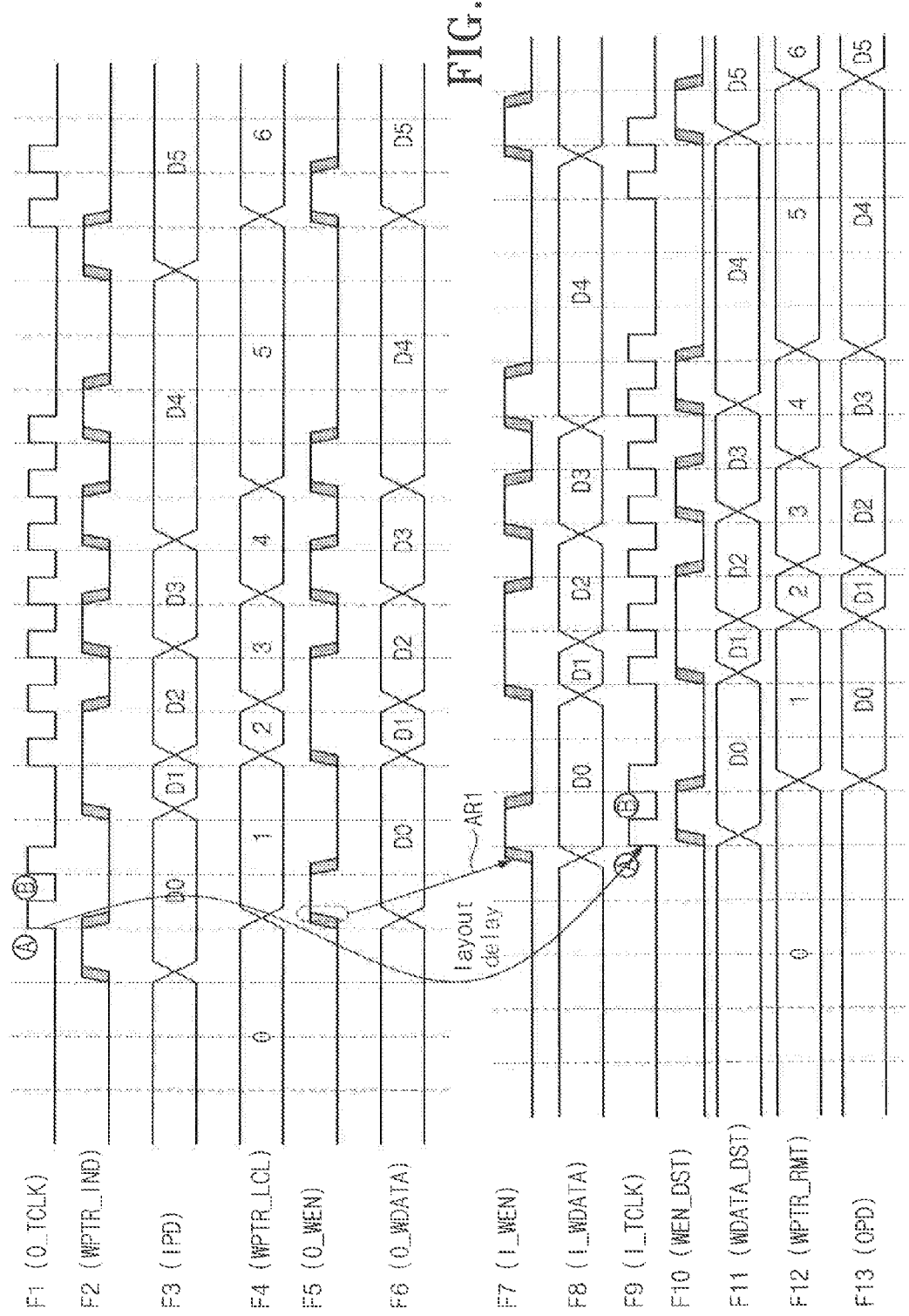
FIG. 3 is a timing diagram illustrating an operation of a payload transfer in FIG. 2, according to an exemplary embodiment of the present inventive concept.

The FIG. 3 is a timing diagram of a payload transfer operation in FIG. 2, according to an exemplary embodiment of the present inventive concept.

Referring to FIG. 3, F1 is the transmitter clock output signal O_TCLK that is generated by the transmitter clock generator 18 in FIG. 2. F2 is a write indication signal (WPTR_IND) generated by the gating unit 6 in FIG. 2. F3 is a payload IPD that is input data inputted to the payload input unit 2 in FIG. 2. F4 is the local write pointer signal (WPTR_LCL) generated by the local read pointer generator 12 in FIG. 2. F5 is the write enable signal (O_WEN) generated by the flip-flop 10 in FIG. 2. F6 is the latched payload data as a write data output signal (O_WDATA) that is outputted from the flip-flop 4 in FIG. 2.

F7 is the write enable input signal (I_WEN) in the second interface 220 that is a delayed version of the write enable output signal (O_WEN) F5 in the first interface 120. The write enable output signal (O_WEN) F5 in the first interface 120 propagates through the buffers Bu10, Bu20, Bu30 on the second bus line B12 in the long-hop channel B10 and is inputted to the flip-flop 36 as the write enable input signal (I_WEN) F7 in the second interface 220.

F8 is the write data input signal (I_WDATA) in the second interface 220 that is a delayed version of the write data output signal (O_WDATA) F6 in the first interface 120. The write data output signal (O_WDATA) F6 in the first interface 120 propagates through the buffers Bu1, Bu2, Bu3 on the first bus line B11 in the long-hop channel B10 and is inputted to the flip-flop 30 in the second interface 220 as the write data input signal (I_WDATA) F8.

F9 is the transmitter clock input signal (I_TCLK) in the second interface 220 that is a delayed version of the transmitter clock output signal (O_TCLK) F1 in the first interface 120. The transmitter clock output signal (O_TCLK) F1 in the first interface 120 propagates through the buffers Bu11, Bu21, Bu31 on the third bus line B13 in the long-hop channel B10 and is inputted to the clock recovery unit 38 in the second interface 220 as the transmitter clock input signal (I_TCLK) F9.

F10 is the latched write enable signal (WEN_DST) that is outputted from the flip-flop 36 in synchronization with a recovered transmitter clock signal TCLK1 generated in the second interface 220.

F11 is the latched write data (WDATA_DST) that is outputted from the flip-flop 30 in synchronization with a recovered transmitter clock signal TCLK1 generated in the second interface 220.

F12 is the remote write pointer signal (WPTR_RMT) generated in the payload storage 230 based on the received write enable signal (I_WEN). The remote write pointer signal (WPTR_RMT) F12 may make the second interface 220 follow the local write pointer (WPTR_LCL) F4 in the first interface 120 although the first interface 120 and the second interface 220 are separated by the long-hop channel B10 over the distance L20.

F13 may be output signals of payload data (OPD) stored in the entries of the FIFO memory 34.

D0-D5 correspond to data, 0-6 of F4 correspond to local write pointer values, and 0-6 of F12 correspond to remote write pointer values.

The transmitter clock output signal (O_TCLK) F1 may be provided to the flip-flops 4 and 10 and the local read pointer generator 12 in the transmitter 130 of the first interface 120 in FIG. 2. The transmitter clock input signal (I_TCLK) F9 is provided to the flip-flops 30 and 36 in the payload storage 230 of the second interface 220 in FIG. 2. The transmitter clock input signal F9 may be recovered by the clock recovery unit 38 if the transmitter clock input signal F9 has a clock skew to be adjusted before being provided to the flip-flops 30 and 36.

The signals F1, F5 and F6 may start from the first interface 120 and be delayed, for example, over one clock cycle as shown by the arrow AR1 in FIG. 3. The delay illustrated by the arrow AR1 may occur due to a layout routing delay based on temperature or routing conditions such as length, width, resistance or parasitic capacitance of a routing conductor for layout routing in the SoC 150.

The transmitter clock output signal (O_TCLK) F1 may stop toggling when the first interface 120 waits until the transmitter 130 can transfer payloads; otherwise, the transmitter clock output signal (O_TCLK) F1 may always toggle. The second interface 220 may recover the transmitter clock output signal (O_TCLK) F1 by generating the recovered transmitter clock TCLK1 from the transmitter clock input signal (I_TCLK) F9 through the third bus line B13.

Figure 4:
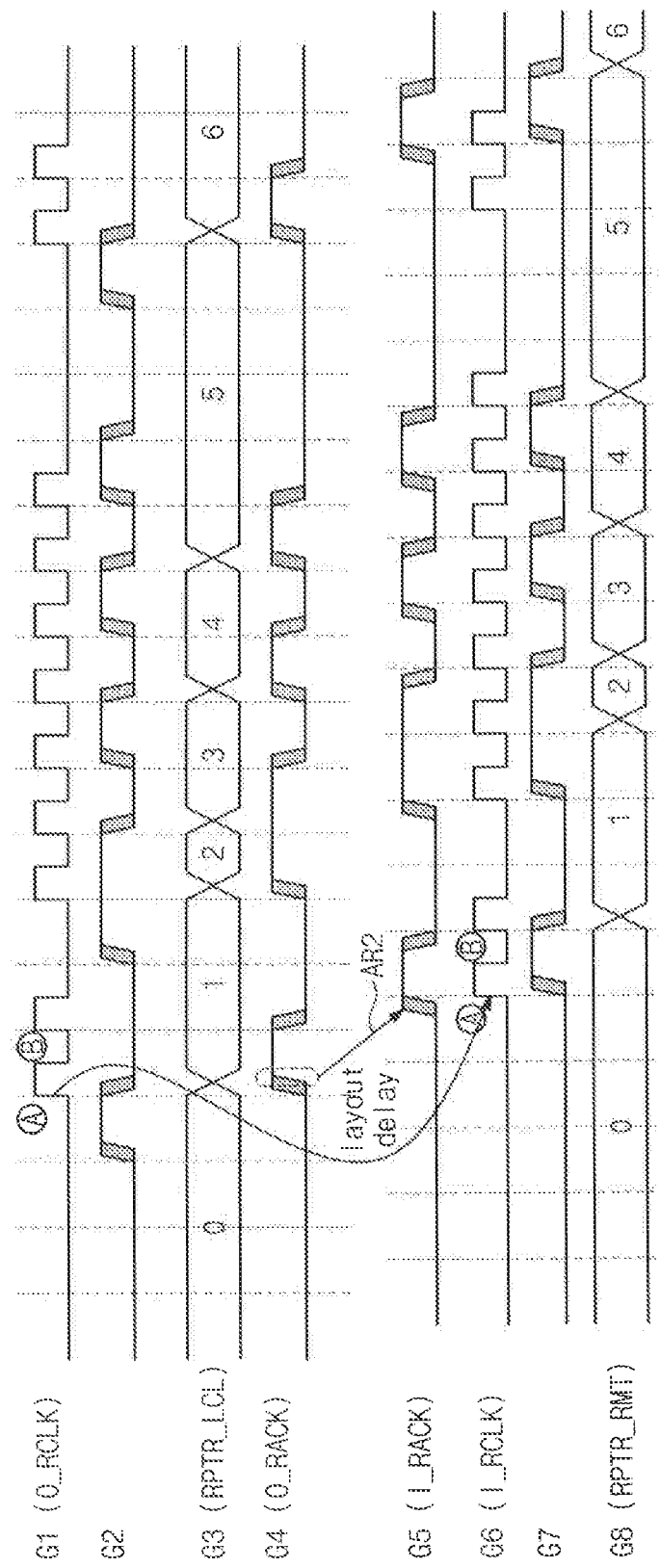
FIG. 4 is a timing diagram illustrating an operation of an acknowledge transfer in FIG. 2, according to an exemplary embodiment of the present inventive concept.

The FIG. 4 is a timing diagram of an acknowledge transfer operation in FIG. 2, according to an exemplary embodiment of the present inventive concept.

Referring to FIG. 4, G1 is the payload receiver clock output signal (O_RCLK) G1 generated by the receiver clock generator 62. The payload receiver clock output signal (O_RCLK) G1 is transmitted to the first interface 120 from the second interface 220 through a plurality of buffers Bu50, Bu51 and Bu52 on the fifth bus line B22.

G2 is the latched increment signal generated by the output control signal generator 52 based on the indication signal G2A to increase the local read pointer G3.

G3 is the local read pointer (RPTR_LCL) that increases when the payload receiver 240 reads out one of the entries in the FIFO memory 34 in the second interface 220.

G4 is the read acknowledge output signal (O_RACK) generated by the flip-flop 60.

G5 is the read acknowledge input signal (I_RACK) in the first interface 120 that is a delayed version of the read acknowledge output signal (O_RACK) G4 in the second interface 220. The read acknowledge output signal (O_RACK) G4 in the second interface 220 propagates through buffers Bu40, Bu41 and Bu42 on the fourth bus line B21 in the long-hop channel B10 and is inputted to the flip-flop 20 in the first interface 120.

G6 is the receiver clock input signal (I_RCLK) in the first interface 120 that is a delayed version of the payload receiver clock output signal (O_RCLK) G1 in the second interface 220. The payload receiver clock output signal (O_RCLK) G1 in the second interface 220 propagates through the buffers Bu50, Bu51 and Bu52 on the fifth bus line B22 in the long-hop channel B10 and is inputted to the clock recovery unit 26 in the first interface 120.

G7 is the read acknowledge signal in synchronization with the recovered receiver clock RCLK1 based on the read acknowledge input signal (I_RACK) G5.

G8 is the remote read pointer (RPTR_RMT) generated by the enable signal generator 22 in the first interface 120. The remote read pointer G8 increases when the read increment signal G7B is active.

0-6 of G3 correspond to local read pointer values, and 0-6 of G8 correspond to remote read pointer values.

The payload receiver clock output signal (O_RCLK) G1 may be provided to the flip-flops 54 and 60 in the payload receiver 240 of the second interface 220 in FIG. 2. The receiver clock input signal (I_RCLK) G6 may be provided to the flip-flop 20 and the remote read pointer generator 24 in the receiver 140 of the first interface 120 in FIG. 2. The receiver clock input signal G6 may be recovered by the clock recovery unit 26 if the receiver clock input signal G6 has a clock skew to be adjusted before being provided to the flip-flop 20 and the remote read pointer generator 24.

The signals G1 and G4 may start from the second interface 220 and be delayed, for example, over one clock cycle as shown by the arrow AR2 in FIG. 4. The delay illustrated by the arrow AR2 may occur due to a layout routing delay based on temperature or routing conditions such as length, width, resistance or parasitic capacitance of a routing conductor for layout routing in the SoC 150.

The payload receiver clock output signal (O_RCLK) G1 may stop toggling when the second interface 220 waits until the payload receiver 240 can read out one of the entries of the FIFO memory 34; otherwise, the payload receiver clock output signal (O_RCLK) G1 may always toggle. The first interface 120 may recover the payload receiver clock output signal (O_RCLK) G1 by generating the recovered clock RCLK1 from the received clock input signal (I_RCLK) G6 through the fifth bus line B22.

The long-hop channel L20 may perform a synchronous transaction to transmit the write data output signal (O_WDATA) F6 from the transmitter 130 of the first interface 120 to the payload storage 230 in the second interface 220 in synchronization with the transmitter clock output signal (O_TCLK) F1. The short channel L10 may operate an asynchronous transaction to transfer payloads from the payload storage 230 in the second interface 220 to the multiplexer 37 in the second interface 220.

The long-hop channel L20 may perform a synchronous transaction to transfer the read acknowledge output signal (O_RACK) G4 from the payload receiver 240 of the second interface 220 to the receiver 140 in the first interface 120 in synchronization with the payload receiver clock output signal (O_RCLK) G1. The short channel L11 may operate an asynchronous transaction to transfer the remote read pointer (RPTR_RMT) G8 from the receiver 140 in the first interface 120 to the synchronizer 16 in the first interface 120.

According to the description of FIGS. 1 to 4, the change from a long asynchronous transmission line to a long synchronous transmission line compared to an asynchronous interface having a long asynchronous transmission line can make the interface with a long-hop channel between the transmitter circuit 100 and the receiver circuit 200 simple and effective.

Referring to FIG. 1, the long-hop channel B20 may operate the same as the long-hop channel B10 does when the second IP 260 operates as a master and the first IP 160 operates as a slave. In this case, the second interface 220 may include a transmitter and a receiver. The first interface 120 may include a payload storage and a payload receiver.

If the SoC 150 includes the long-hop channels B10 and B20, the first IP 160 and the second IP 260 may perform a bidirectional operation to transfer payload.

Figure 5:
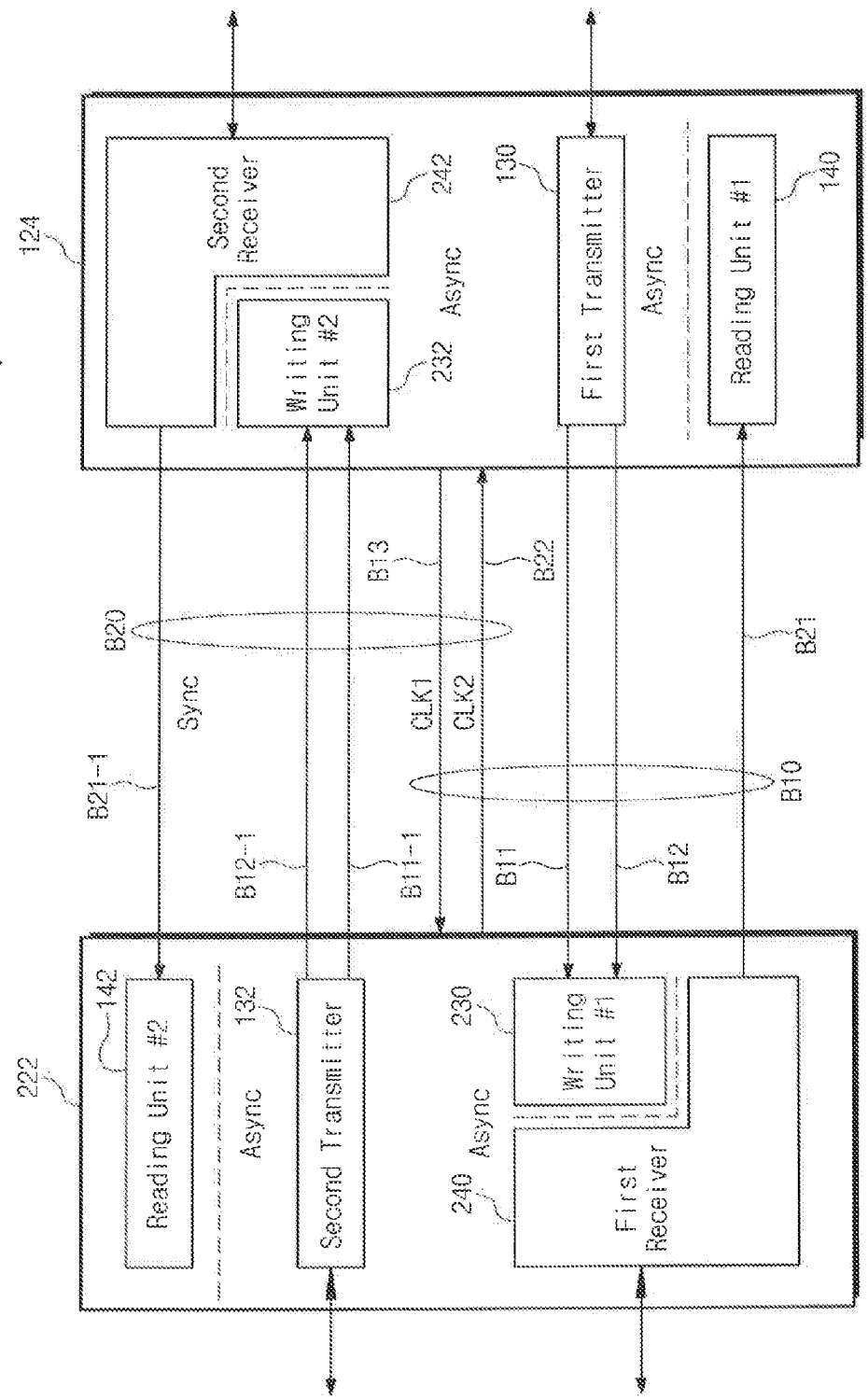
FIG. 5 is a block diagram of an asynchronous interface circuit according to an exemplary embodiment of the present inventive concept.

FIG. 5 is a block diagram of an asynchronous interface circuit according to an exemplary embodiment of the present inventive concept.

Referring to FIG. 5, an asynchronous interface circuit 115 may include a first interface 124, a second interface 222 and a bidirectional long-hop channel. The bidirectional long-hop channel may include a first long-hop channel B10 and a second long-hop channel B20.

The first interface 124 may include a first transmitter 130, a first reading unit 140 as a receiver, a second writing unit 232 as a payload storage and a second receiver 242.

The second interface 222 may include a second transmitter 132, a second reading unit 142 as a receiver, a first writing unit 230 as a payload storage and a first receiver 240.

The first long-hop channel B10 may include a plurality of bus lines B11, B12, B13, B21 and B22. The plurality of bus lines B11, B12 and B21 in FIG. 5 may correspond to the bus lines B11, B12 and B21 in FIG. 2. For the sake of convenient explanation, the bus line B13 and the bus line B22 in FIG. 2 may transmit a first interface clock signal CLK1 and a second interface clock signal CLK2 in FIG. 5 respectively.

The second long-hop channel B20 may include a plurality of bus lines B11-1, B12-1, B13, B21-1 and B22. The plurality of bus lines B11-1, B12-1 and B21-1 in FIG. 5 may operate the same as the bus lines B11, B12 and B21 in FIG. 5.

Accordingly, the first long-hop channel B10 and the second long-hop channel B20 may share the bus lines B13 and B22 to transfer the first interface clock signal CLK1 and the second interface clock signal CLK2. In other words, the long-hop channels B10 and B20 sharing the bus lines B13 and B22 may perform a bidirectional operation to transfer a payload independently.

Moreover, the second reading unit 142 and the first writing unit 230 in the second interface 222 may share the first interface clock signal CLK1 as a clock source. The second writing unit 232 and the first reading unit 140 in the first interface 124 may share the second interface clock signal CLK2 as a clock source.

The first transmitter 130 in the first interface 124 may transmit a first payload to the first writing unit 230 and the first reading unit 140 in the first interface 124 may receive an acknowledge signal from the first receiver 240 in the second interface 222.

The second transmitter 132 in the second interface 222 may transmit a second payload to the second writing unit 232 and the second reading unit 142 in the second interface 222 may receive an acknowledge signal from the second receiver 242 in the first interface 124.

According to FIG. 5, at least one of the first interface 124 and the second interface 222 may operate as a master interface or a slave interface.

Figure 6:
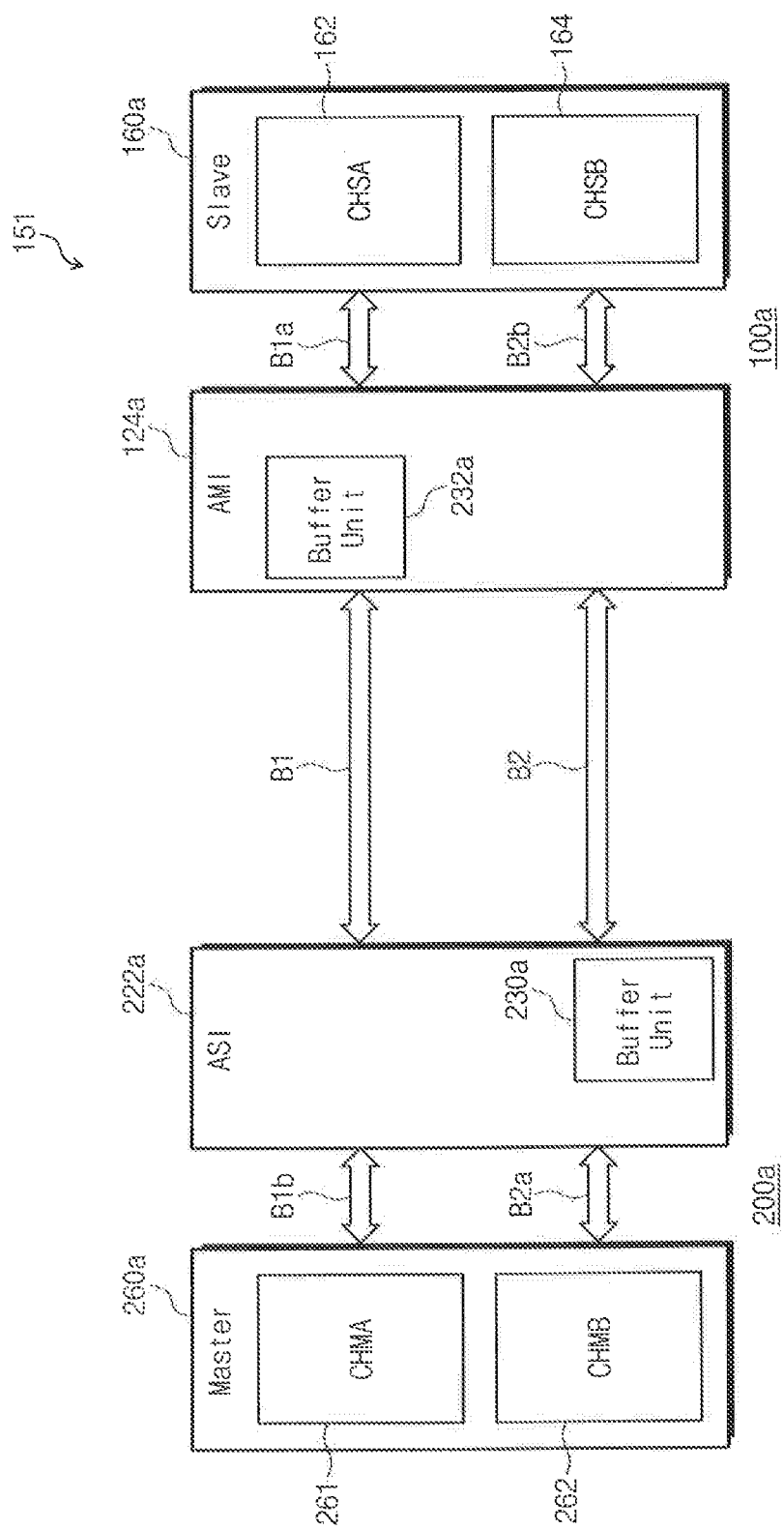
FIG. 6 is a block diagram of a SoC according to an exemplary embodiment of the present inventive concept.

FIG. 6 is a block diagram of a SoC according to an exemplary embodiment of the present inventive concept.

Referring to FIG. 6, a SoC 151 may include a transmitter circuit 100A and a receiver circuit 200A as function blocks connected by at least one of long-hop channels B1 and B2. Although the transmitter circuit 100A and the receiver circuit 200A are named for the sake of convenient description, the transmitter circuit 100A and the receiver circuit 200A can be named interchangeably.

The transmitter circuit 100A may include a first IP 160A as a slave IP and a first interface 124A as an asynchronous master interface AMI.

The receiver circuit 200A may include a second IP 260A as a master IP and a second interface 222A as an asynchronous slave interface ASI.

Each of the long-hop channels B1 and B2 may include a payload signal, a write enable signal, a transmitter clock signal, a receiver clock signal and a read acknowledge signal. The transmitter clock signal and the receiver clock signal may be shared by the channel B1 and B2.

The first interface 124A may include a buffer unit 232A to receive a payload from the second interface 222A in synchronization with a transmitter clock generated by the second interface 222A. The buffer unit 232A may include a FIFO memory.

The second interface 222A may include a buffer unit 230A to receive a payload from the first interface 124A in synchronization with a transmitter clock generated by the first interface 124A. The buffer unit 230A may include a FIFO memory.

The first IP 160A may be connected to the first interface 124A through buses B1A and B2B. The first IP 160A may include channels 162 (CHSA) and 164 (CHSB) that can be a read or a write channel respectively. The channels 162 (CHSA) and 164 (CHSB) may communicate with the first interface 124a through the buses B1A and B2B.

The first IP 160A may be a memory component that has multiple channels connected by the buses B1A and B2B. Each of the multiple channels 162 (CHSA) and 164 (CHSB) may be a unidirectional channel for a read or a write or may be a bidirectional channel for a read and a write. Here, the memory component may be a register, a volatile memory such as SRAM or DRAM, a nonvolatile memory such as NAND flash memory, NOR flash memory, phase change random access memory (PRAM), ferroelectric random access memory (FRAM), etc.

The second IP 260A may be connected to the second interface 222A through buses B1B and B2A. The second IP 260A may include channels 261 (CHMA) and 262 (CHMB) that can control the slave IP respectively. The channels 261 (CHMA) and 262 (CHMB) may communicate with the second interface 222A through the buses B1B and B2A.

The second IP 260A may be a memory controller that has multiple channels connected by the buses B1a and B2b. Each of the multiple channels 261 (CHMA) and 262 (CHMB) may be a unidirectional channel for control of a read or a write of the memory component.

Figure 7:
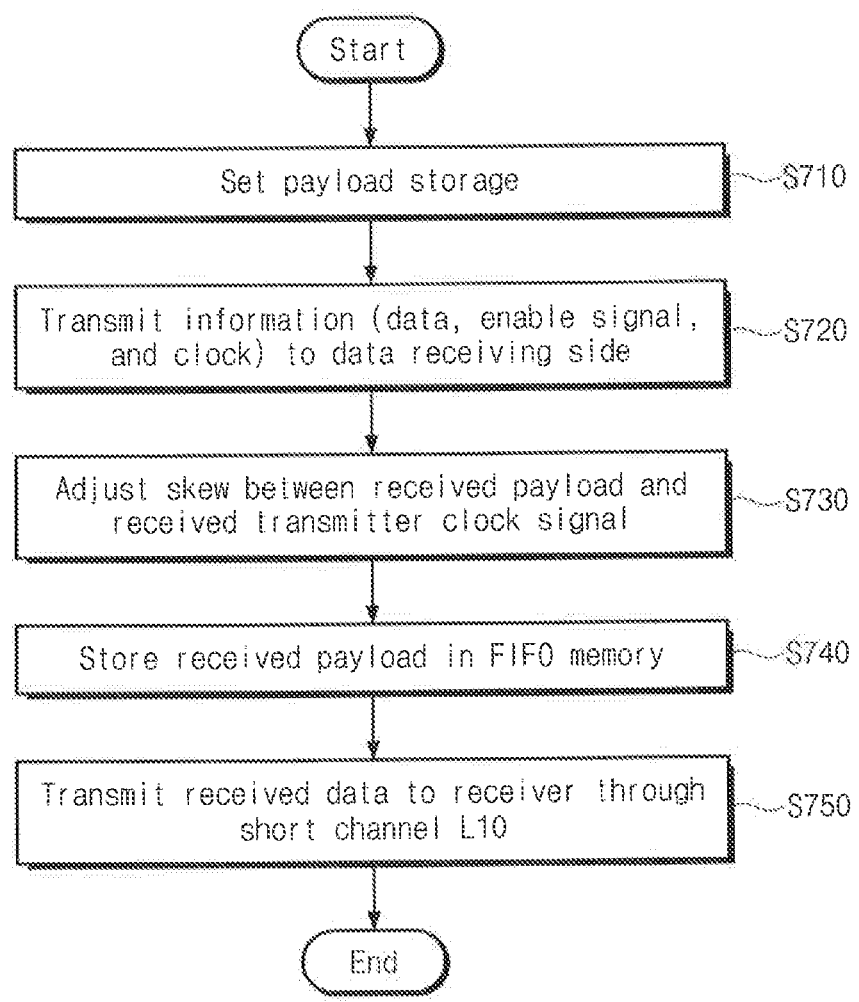
FIG. 7 is a flowchart illustrating a method of operating a first asynchronous interface in FIG. 2, according to an exemplary embodiment of the present inventive concept.

FIG. 7 is a flowchart illustrating a method of operating a first asynchronous interface in FIG. 2, according to an exemplary embodiment of the present inventive concept.

Referring to FIG. 2, the method of operating a first asynchronous interface may include transmitting by the first interface 120 the write data output signal (O_WDATA) F6, a write enable output signal (O_WEN) F5 and a transmitter clock output signal (O_TCLK) F1.

Referring now to FIGS. 2 and 7, the second interface 220 is configured to set the payload storage 230 to receive a payload from the first interface 120 at step S710.

At step S720, the second interface 220 may receive the payload F6 through the bus line B11 from the first interface 120 and latch the payload F6 by the flip-flop 30 in the payload storage 230. Moreover, the second interface 220 may receive the write enable output signal F5 and the transmitter clock output signal F1 through the bus lines B12 and B13. The bus lines B11, B12 and B13 may be in the long-hop channel L20 that has long conductor lines between the first interface 120 and the second interface 220.

At step S730, the clock recovery unit 38 may generate a recovered transmitter clock signal TCLK1 by adjusting a clock skew between the received payload and the received transmitter clock signal such that the clock skew is under a maximum allowable clock skew range. The clock recovery unit 38 may include a DLL circuit to adjust the clock skew.

At step S740, the received payload is stored in the FIFO memory 34 in the payload storage 230 based on a remote write pointer F12 generated in the second interface 220. The remote write pointer F12 may be a target address to choose one of the entries of the FIFO memory 34 based on the recovered transmitter clock signal TCLK1 and the received write enable signal.

At step S750, the payload stored in the FIFO memory 34 may be transmitted asynchronously to the payload receiver 240 through the short channel L10.

Accordingly, the method of operating a first asynchronous interface may make the first asynchronous interface, which is located between functional blocks that are a long distance from each other, efficient in view of circuit complexity and transfer performance.

Figure 8:
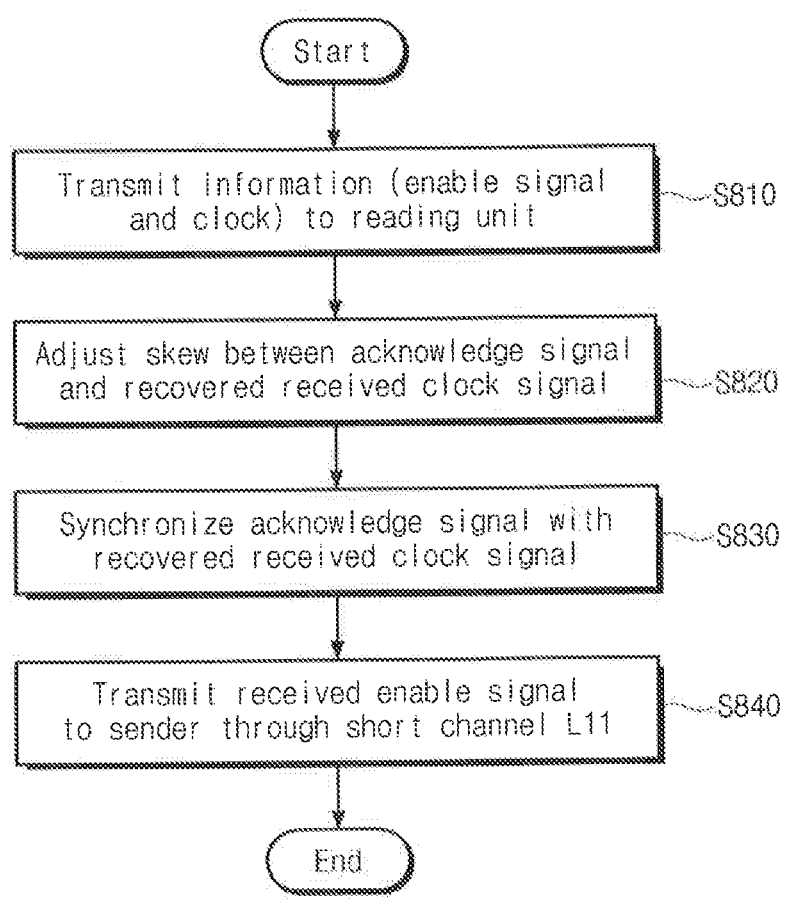
FIG. 8 is a flowchart illustrating a method of operating a second asynchronous interface in FIG. 2, according to an exemplary embodiment of the present inventive concept.

FIG. 8 is a flowchart illustrating a method of operating a second asynchronous interface in FIG. 2, according to an exemplary embodiment of the present inventive concept;

Referring to FIG. 2, the method of operating a second asynchronous interface may include receiving by the first interface 120 a receiver clock input signal (I_RCLK) G6 and a read acknowledge input signal (I_RACK) G5.

Referring now to FIGS. 2 and 8, at step S810, the first interface 120 receives the receiver clock input signal G6 and the read acknowledge input signal G5 from the second interface 220 through the long-hop channel L20.

At step S820, the clock recovery unit 26 may generate a recovered receiver clock signal RCLK1 by adjusting a clock skew between the received acknowledge signal and the received receiver clock signal such that the clock skew is under a maximum allowable clock skew range. The clock recovery unit 26 may include a DLL circuit to adjust the clock skew.

At step S830, the flip-flop 20 in the first interface 120 may generate a read acknowledge signal G7 in synchronization with the recovered receiver clock signal RCLK1 based on the read acknowledge input signal (I_RACK) G5. The enable signal generator 22 may generate a read increment signal G7B based on the read acknowledge signal G7 in synchronization with the recovered receiver clock signal RCLK1.

At step S840, the read increment signal G7B may be transmitted asynchronously to the transmitter 130 in the first interface 120 through the short channel L11.

Accordingly, the method of operating a second asynchronous interface may make the second asynchronous interface, which is located between functional blocks that are a long distance from each other, efficient in view of circuit complexity and transfer performance.

When the exemplary embodiments of the present inventive concept in FIGS. 1 to 6 are embodied in a SoC, a static timing analysis (STA) may be used to meet a digital logic timing sign-off condition. A designer can adjust the layout floor planning to place the long-hop channel L20 and the short channels L0 and L11 at right places in a layout of the SoC to meet a design specification for speed and power consumption.

When the clock skew between the received transmitter clock signal F9 and the received payload F8 can be adjusted within a maximum allowable range, the received transmitter clock signal F9 may be used as a recovered transmit clock signal without performing a clock recovering process.

When the clock skew between the received receiver clock signal G6 and the received acknowledge signal G5 can be adjusted within a maximum allowable range, the received receiver clock signal G6 may be used as a recovered receiver clock signal without performing a clock recovering process.

Figure 9:
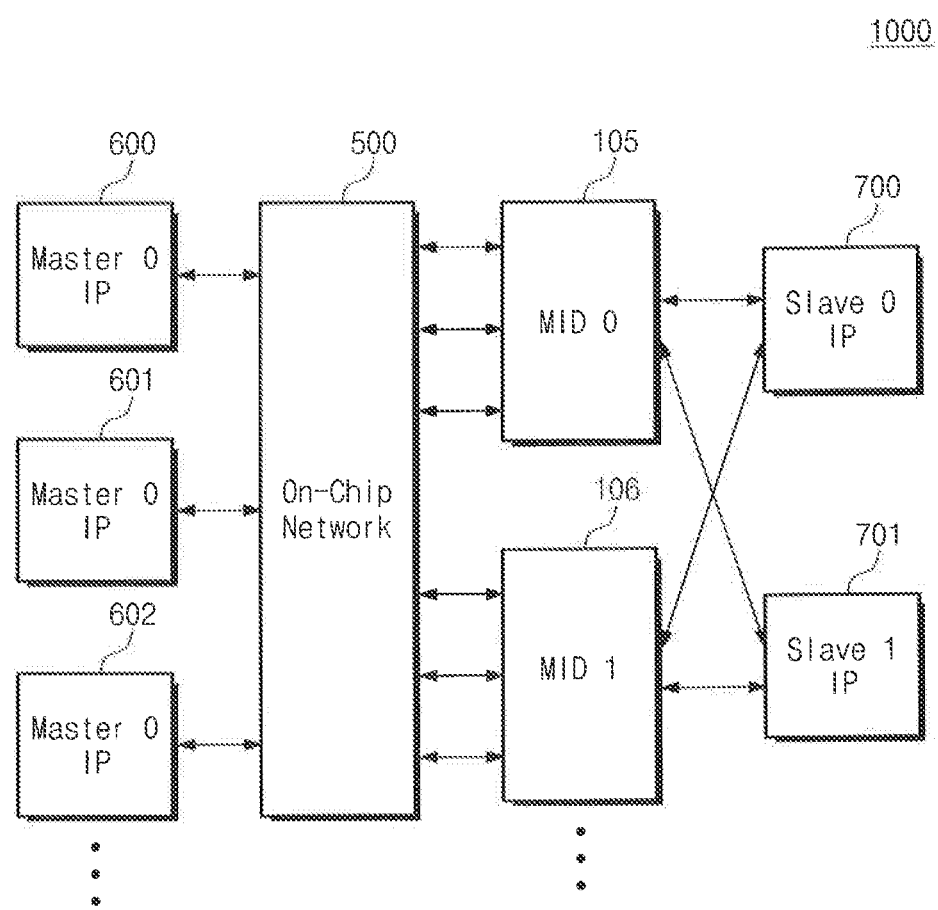
FIG. 9 is a block diagram of a SoC according to an exemplary embodiment of the present inventive concept.

FIG. 9 is a block diagram of a SoC according to an exemplary embodiment of the present inventive concept.

Referring to FIG. 9, the SoC 1000 may include a plurality of master IPs 600, 601 and 602, a on-chip network 500, a plurality of slave IPs 700 and 701, and a memory interleaving devices (hereafter referred to MIDs) 105 and 106.

The master IPs 600, 601 and 602 may be a CPU, a Coder and Decoder (CODEC), a display, an image sensor, etc. The slave IPs 700 and 701 may be a memory mapping device.

The on-chip network 500 may be a network interface to manage the data and control flow in the SoC 1000. The on-chip network 500 may be embodied on the same substrate of the SoC 1000 or more than one chip.

Each of the MIDs 105 and 106 may be connected between each of the three master IPs 600, 601 and 602 and each of the two slave IPs 700 and 701 and may distribute read/write requests from the master IPs 600 to 602 to the slave IPs 700 and 701 based on control information. The on-chip network 500 may connect the three master IPs 600, 601 and 602 to the each of the MIDs 105 and 106.

Referring to FIG. 9, the SoC 1000 may operate according to a modified Advanced eXtensible Interface (MAXI) bus protocol. In other words, an asynchronous handshaking feature that provides a transmitter clock and a receiver clock with a payload and a response signal may be used make a bus protocol operate effectively in a long-hop channel. Here, a FIFO memory in a transmitter side is moved to a receiver side for efficiency in view of performance and complexity. Moreover, the asynchronous interface may be applied to other bus protocols such as AXI, Advanced High Performance Bus (AHB), Advanced Peripheral Bus (APB) and Advanced System Bus (ASB) in the Advanced Microcontroller Bus Architecture (AMBA), etc. By adding any one of signals such as a transmitter clock, a receiver clock, a enable signal, and an acknowledge signal, any synchronous bus protocol can be modified to a bus protocol covering an asynchronous bus interface in a long-hop channel.

Each of the MIDs 105 and 106 may operate according to the MAXI protocol when one of the master IPs 600 to 602 needs to access one of the slave IPs 700 and 701 which may operate in a different clock domain from a clock domain of one of the master IPs 600 to 602.

In case of an asynchronous interface between two function blocks, for example, the first master IP 600 and the first slave IP 700 that operate under the AXI protocol in different clock domains, the two function blocks may operate under the MAXI protocol by transmitting each clock signal of the two function blocks to the other of the two function blocks.

The number of MAXI channels connected to the on-chip network 500 or the MIDs 105 and 106 is not limited to two or three and may be one or more than three according to the number of masters and slaves that are connected to the on-chip network 500 or the MIDs 105 and 106.

When one of the MAXI channels is a long-hop channel, the asynchronous interface circuit 105 in FIG. 2 may be the MIDs 105 and/or 106 of the SoC 1000 in FIG. 9. The asynchronous interface circuit 105 in FIG. 2 may be included in the on-chip network 500 of the SoC 1000 in FIG. 9.

Figure 10:
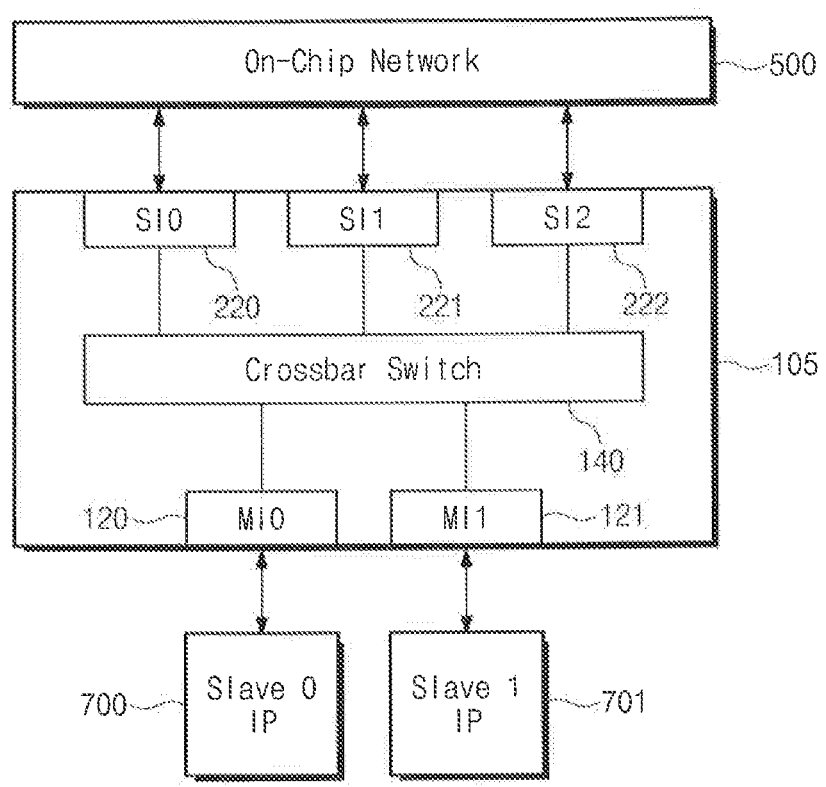
FIG. 10 is a block diagram of a memory interleaving device according to an exemplary embodiment of the present inventive concept.

FIG. 10 is a block diagram of a memory interleaving device according to an exemplary embodiment of the present inventive concept.

Referring to FIG. 10, a MID 105 may include three slave interfaces 220 (SI0), 221 (SI1), 222 (SI2), two master interfaces 120 (MI0) and 121 (MI1) and a crossbar switch 140. The interfaces 120 (MI0), 121 (MI1), 220 (SI0), 221 (SI1) and 222 (SI2) may operate according to the MAXI protocol.

For the sake of convenient description, an interface connected to a master IP is referred to a slave interface and an interface connected to a slave IP is referred to a master interface based on the ownership of data flow.

The slave interfaces 220 (SI0), 221 (SI1) and 222 (SI2) may be connected to the on-chip network 500. The master interfaces 120 (MI0) and 121 (MI1) may be connected to the slave IPs 700 and 701. The slave interfaces 220 (SI0), 221 (SI1) and 222 (SI2) and the master interfaces 120 (MI0) and 121 (MI1) may be connected to each other through the crossbar switch 140.

One of the slave interfaces, for example, 220 (SI0) and one of the master interface, for example, 120 (MI0) may be connected by an asynchronous long-hop channel. The slave interface 220 (SI0) may include a FIFO memory to store read data transmitted from the slave IP 700. The master interface 120 (MI0) may include a FIFO memory to store write data transmitted from the master IP 600 (of FIG. 9).

The asynchronous long-hop channel may be connected between the slave interface 220 (SI0) and the master interface 120 (MI0) through the crossbar switch 140. The asynchronous long-hop channel may be designed by the MAXI bus protocol described in FIGS. 1 to 9.

The read/write data transfer between the master IP 600 (of FIG. 9) and the slave IP 700 (of FIG. 9) is performed asynchronously although the read/write data transfer between the slave interface 220 (SI0) and the master interface 120 (MI0) is performed synchronously by providing a clock signal which is synchronous with the read/write data. As described in FIGS. 1 to 9, the received read/write data is transmitted asynchronously to the master IP 600 or the slave IP 700 through a short channel.

The clock signal is provided by a sender that provides the read or write data and an acknowledge signal. The acknowledge signal may be transmitted between the slave interface 220 (SI0) and the master interface 120 (MI0) in response to the read/write data and be asynchronous with the read/write data.

The crossbar switch 140 may distribute read/write requests initiated by the master IPs 600 to 603 and read/write data between the master IPs 600 to 603 and the slave IPs 700 to 701.

Accordingly, the asynchronous interface circuit 105 in FIG. 2 may be applied to the SoC 1000 by using the AXI bus protocol and an on-chip network having MIDs 105 and 106 in the SoC 1000 as described in FIGS. 9 and 10.

Figure 11:
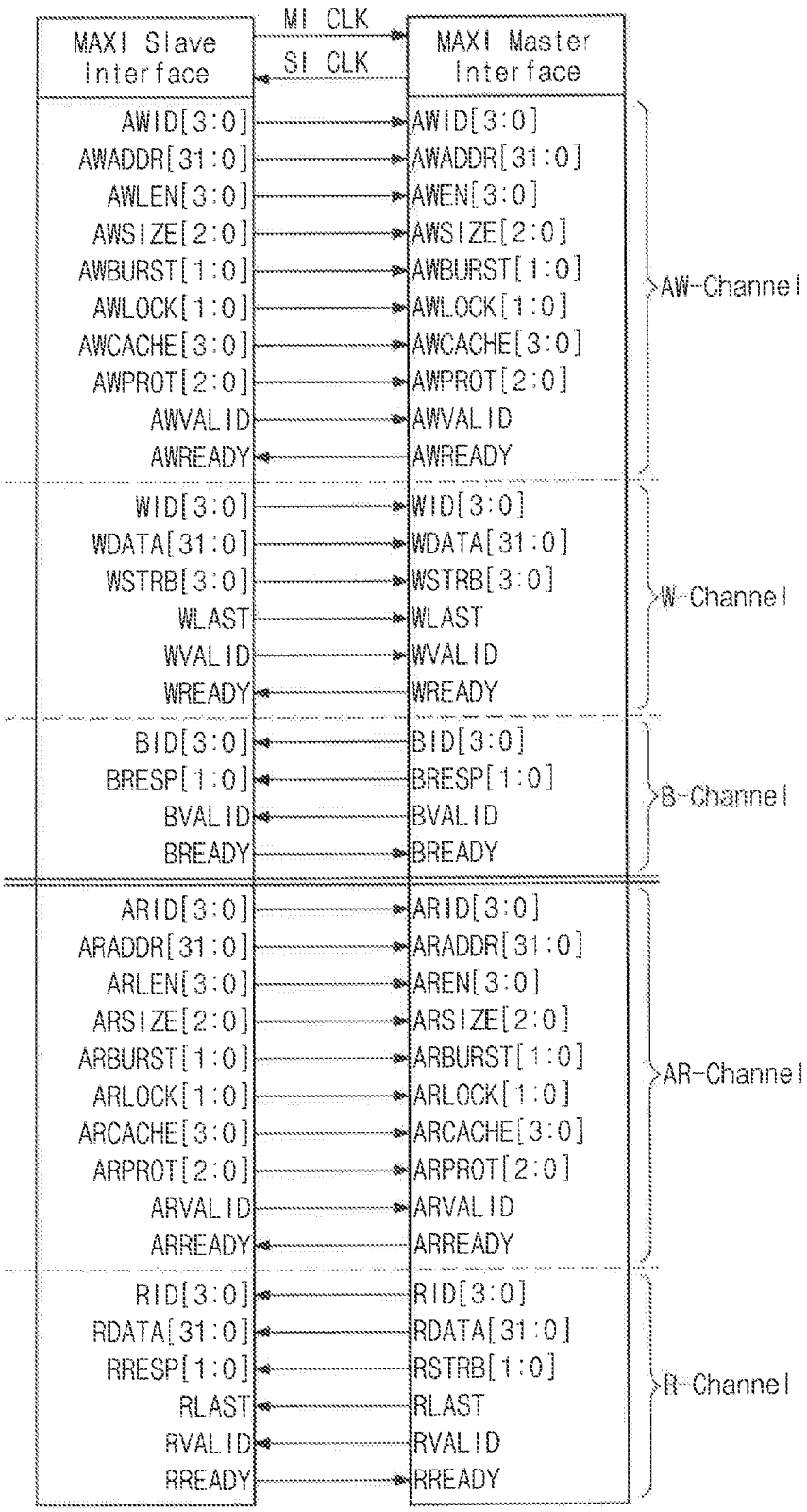
FIG. 11 is a block diagram of a plurality of modified Advanced eXtensible Interface (MAXI) channels according to an exemplary embodiment of the present inventive concept.

FIG. 11 is a block diagram of a plurality of MAXI channels according to an exemplary embodiment of the present inventive concept.

The MAXI bus protocol includes a read address channel (hereafter referred to as the AR-channel) and a read data channel (hereafter referred to as the R-channel) for a read operation, a write address channel (hereafter referred to as the AW-channel), a write data channel (hereafter referred to as the W-channel) and a write response channel (hereafter referred to as the B-channel).

The AR-channel may transmit a read address (ARADDR) with a read address enable signal (ARVALID) from the master to the slave. Then, the AR-channel may transmit an acknowledge signal (ARREADY) from the slave to the master.

The R-channel may transmit a read data (RDATA) with a read data enable signal (RVALID) from the slave to the master. Then, the R-channel may transmit an acknowledge signal (RREADY) from the master to the slave.

The AW-channel may transmit a write address (AWADDR) with a write address enable signal (AWVALID) from the master to the slave. Then, the AW-channel may transmit an acknowledge signal (AWREADY) from the slave to the master.

The W-channel may transmit a write data (WDATA) with a write enable signal (WVALID) from the master to the slave. Then, the W-channel may transmit an acknowledge signal (WREADY) from the slave to the master.

The B-channel may transmit a response of write completion (BRESP) with a response enable signal (BVALID) from the slave to the master. Then, the B-channel may transmit an acknowledge signal (BREADY) from the master to the slave.

The AW-channel may include AWID (Write Address ID), AWADDR (Write Address), AWLEN (Burst Length), AWSIZE (Burst Size), AWBURST (Burst Type), AWVALID (Write Address/Control Valid) and AWREADY (Write Address/Control Accepted).

The W-channel may include WID (Write Data ID), WDATA (Write Data), WSTRB (Write Strobe), WLAST (Last Write Transfer In a Burst), WVALID (Write Data Valid) and WREADY (Write Data Accepted).

The B-channel may include BID (Write Data ID), BRESP (Write Response), BVALID (Write Response Valid) and BREADY (Write Response Accepted).

The AR-channel may include ARID (Read Address ID), ARADDR (Read Address), ARLEN (Burst Length), ARSIZE (Burst Size), ARBURST (Burst Type), ARVALID (Read Address/Control Valid) and ARREADY (Read Address/Control Accepted).

The R-channel may include RID (Read Data ID), RDATA (Read Data), RRESP (Read Response), RLAST (Last Read Transfer in a Burst), RVALID (Read Data Valid) and RREADY (Read Data Accepted).

Each of the AR-channel, the R-channel, the AW-channel, the W-channel and the B-channel may be an asynchronous long-hop channel and may be located independently between a master and a slave and may share a master clock MI_CLK and a slave clock SI_CLK.

Figure 12:
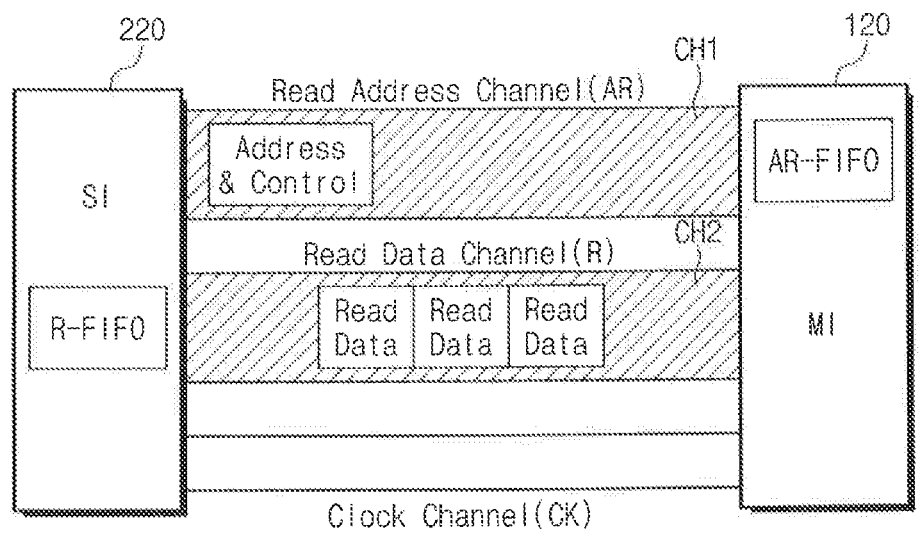
FIG. 12 is a block diagram illustrating a transaction between a master interface and a slave interface in a SoC according to an exemplary embodiment of the present inventive concept.
Figure 12:
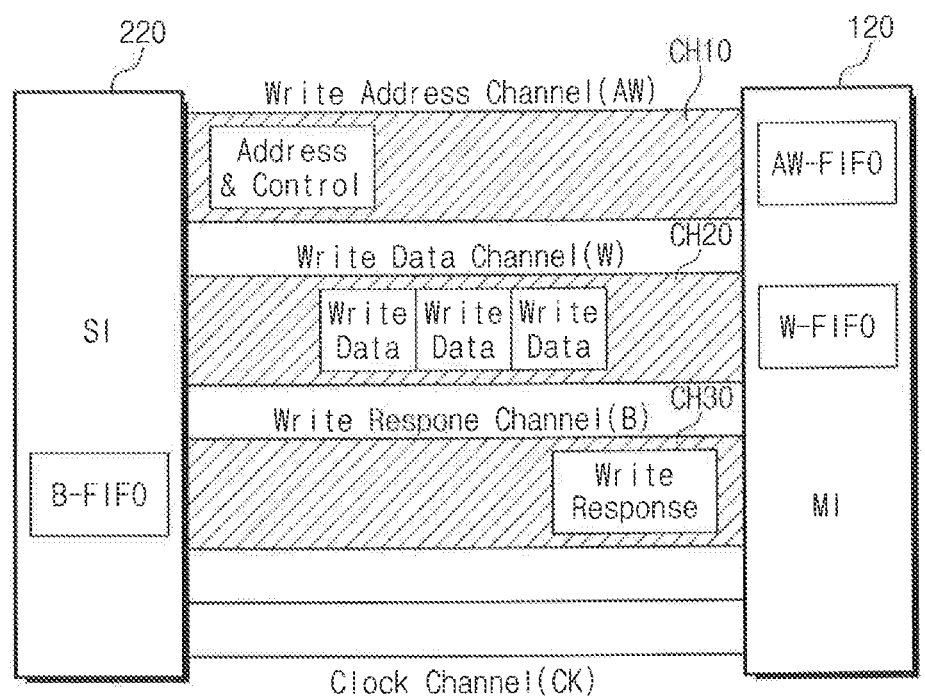

Accordingly, the AR-channel may be connected to a FIFO memory (e.g., a read address buffer queue) to store a read address transmitted through the AR-channel. The R-channel may be connected to a FIFO memory (e.g., a read data buffer queue) to store a read data transmitted through the R-channel. The AW-channel may be connected to a FIFO memory (e.g., a write address buffer queue) to store a write address transmitted through the AW-channel. The W-channel may be connected to a FIFO memory (e.g., a write data buffer queue) to store a write data transmitted through the W-channel. The B-channel may be connected to a FIFO memory (e.g., a response buffer queue) to store a response transmitted through the B-channel. FIG. 12 will provide the details about the FIFO memories as buffer queues.

A valid signal and a ready signal in a channel of the MAXI protocol may correspond to an enable signal and an acknowledge signal in a channel in FIGS. 1 and 6. The bus line B11 and the bus line B21 in FIG. 2 may correspond respectively to WDATA and WREADY of the W-channel, for example.

An asynchronous long-hop channel may include the AW-channel, the W-channel, and the B-channel for a write operation, and the AR-channel and the R-channel for a read operation.

The asynchronous long-hop channel may include a clock channel CK-channel having the master clock MI_CLK and the slave clock SI_CLK for a read and a write operation. The bus line B11 and the bus line B21 in FIG. 2 may correspond respectively to the W-channel and the B-channel respectively, for example.

FIG. 12 is a block diagram illustrating a transaction between a master interface and a slave interface in a SoC according to an exemplary embodiment of the present inventive concept.

A SoC may include a slave interface 220 and a master interface 120 that are connected through a AR-channel, a R-channel, a AW-channel, a W-channel or a B-channel.

The master interface 120 may include a read address FIFO memory AR-FIFO for the AR-channel to receive a read address from the slave interface 220. The slave interface 220 may include a read data FIFO memory R-FIFO for the R-channel to receive a read data from the master interface 120.

The master interface 120 may further include a write address FIFO memory AW-FIFO for the AW-channel to receive a write address from the slave interface 220. The master interface 120 may further include a write data FIFO memory W-FIFO for the W-channel to receive a write data from the slave interface 220. The slave interface 220 may further include a response FIFO memory B-FIFO for the B-channel to receive a response from the master interface 120.

Referring to FIG. 12, a read transaction may be performed by using the AR-channel (CH1) and the R-channel (CH2) and a write transaction may be performed by using the AW-channel (CH10), the W-channel (CH20) and the B-channel (CH30) between the master interface 120 and the slave interface 220.

The read and write transaction may include a CK-channel having a master clock MI_CLK and a slave clock SI_CLK. The master clock MI_CLK and the slave clock SI_CLK may be shared by the AR-channel, the R-channel, AW-channel, the W-channel and the B-channel.

In the read transaction, the slave interface 220 may transmit a read address and control information to the master interface 120 through the AR-channel to send a read request. The read address may be stored or queued in the AR-FIFO in the master interface 120. In response to the read request, the master interface 120 may transfer read data to the slave interface 220 through R-channel. The read data may be stored or queued in the R-FIFO in the slave interface 220.

In the read transaction, each of the AR-channel and the R-channel may be an asynchronous long-hop channel.

Referring to FIGS. 11 and 12, an ARVALID signal as an enable signal and an ARADDR signal as a payload can be transmitted from the slave interface 220 to the master interface 120 in synchronization with the master clock MI_CLK through the AR-channel. The ARREADY signal as an acknowledge signal can be transmitted from the master interface 120 to the slave interface 220 in synchronization with the slave clock SI_CLK through the AR-channel. The AR-channel may transmit control information with the ARADDR signal. The ARADDR signal, the ARVALID signal and the ARREADY signal may correspond to the bus lines B11, B12 and B21 in FIG. 2 respectively. The master clock MI_CLK and the slave clock SI_CLK may correspond to the bus lines B22 and B13 in FIG. 2 respectively.

A RVALID signal as an enable signal and a RDATA signal as a payload can be transmitted from the master interface 120 to the slave interface 220 in synchronization with the slave clock SI_CLK through the R-channel. A RREADY signal as an acknowledge signal can be transmitted from the slave interface 220 to the master interface 120 in synchronization with the master clock MI_CLK through the R-channel. The RD/VIA signal, the RVALID signal and the RREADY signal may correspond to the bus lines B11, B12 and B21 in FIG. 2 respectively. The master clock MI_CLK and the slave clock SI_CLK may correspond to the bus lines B22 and B13 in FIG. 2 respectively.

A RVALID signal as an enable signal and a RDATA signal as a payload can be transmitted from the master interface 120 to the slave interface 220 in synchronization with the slave clock SI_CLK through the R-channel. A RREADY signal as an acknowledge signal can be transmitted from the slave interface 220 to the master interface 120 in synchronization with the master clock MI_CLK through the AR-channel. The RDATA signal, the RVALID signal and the RREADY signal may correspond to the bus lines B11, B12 and B21 in FIG. 2 respectively. The master clock MI_CLK and the slave clock SI_CLK may correspond to the bus lines B12 and B22 in FIG. 2 respectively.

On the other hand, an asynchronous long-hop channel may include the AR-channel, the R-channel and the CK-channel for a read operation.

The AR-channel may transmit a payload (e.g. ARADDR, ARID, ARSIZE, etc.) with an enable signal (e.g. ARVALID or AREN) in synchronization with the master clock MI_CLK of the CK-channel. The R-channel may transmit an acknowledge signal (e.g. RVALID or RSTRB) with read data (e.g. RDATA) in synchronization with the slave clock SI_CLK.

In the write transaction, each of the AW-channel, the W-channel and the B-channel may be an asynchronous long-hop channel.

Referring to FIGS. 11 and 12, an AWVALID signal as an enable signal and an AWADDR signal as a payload can be transmitted from the slave interface 220 to the master interface 120 in synchronization with the master clock MI_CLK through the AW-channel. The AWREADY signal as an acknowledge signal can be transmitted from the master interface 120 to the slave interface 220 in synchronization with the slave clock SI_CLK through the AW-channel. The AW-channel may transmit control information with the AWADDR signal. The AWADDR signal, the AWVALID signal and the AWREADY signal may correspond to the bus lines B11, B12 and B21 in FIG. 2 respectively. The master clock MI_CLK and the slave clock SI_CLK may correspond to the bus lines B22 and B13 in FIG. 2 respectively.

An WVALID signal as an enable signal and an WDATA signal as a payload can be transmitted from the slave interface 220 to the master interface 120 in synchronization with the master clock MI_CLK through the W-channel. The WREADY signal as an acknowledge signal can be transmitted from the master interface 120 to the slave interface 220 in synchronization with the slave clock SI_CLK through the W-channel. The W-channel may transmit control information with the WADDR signal. The WADDR signal, the WVALID signal and the WREADY signal may correspond to the bus lines B11, B12 and B21 in FIG. 2 respectively. The master clock MI_CLK and the slave clock SI_CLK may correspond to the bus lines B22 and B13 in FIG. 2 respectively.

A BVALID signal as an enable signal and a BRESP signal as a payload can be transmitted from the master interface 120 to the slave interface 220 in synchronization with the slave clock SI_CLK through the B-channel. A BREADY signal as an acknowledge signal can be transmitted from the slave interface 220 to the master interface 120 in synchronization with the master dock MI_CLK through the B-channel. The BRESP signal, the BVALID signal and the BREADY signal may correspond to the bus lines B11, B12 and B21 in FIG. 2 respectively. The master dock MI_CLK and the slave clock SI_CLK may correspond to the bus lines B22 and B13 in FIG. 2 respectively.

On the other hand, an asynchronous long-hop channel may include the AW-channel, the W-channel, the B-channel and the CK-channel for a read operation.

The AW-channel may transmit a first payload (e.g., AWADDR, AWID, AWSIZE, etc.) with a first enable signal (e.g., AWVALID, AWLEN) in synchronization with the master clock MI_CLK of the CK-channel. The W-channel may transmit a second payload (e.g., WDATA, WID, WSTRB, etc.) with a second enable signal (e.g., WVALID or WEN) in synchronization with the master clock MI_CLK of the CK-channel. The B-channel may transmit an acknowledge signal (e.g., BRESP) in synchronization with the slave clock SI_CLK.

Figure 13:
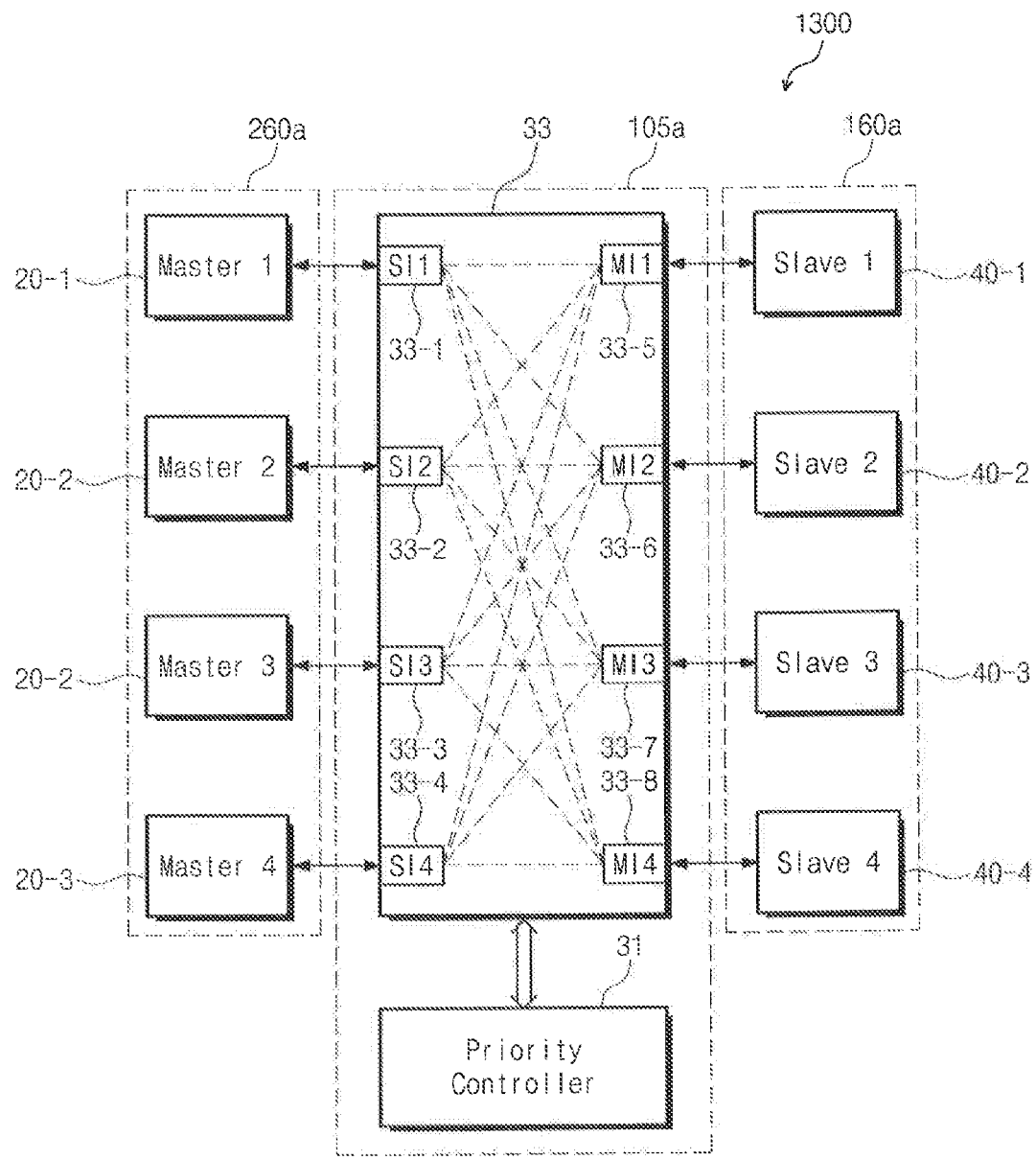
FIG. 13 is a block diagram of a SoC according to an exemplary embodiment of the present inventive concept.

FIG. 13 is a block diagram of a SoC according to an exemplary embodiment of the present inventive concept;

Referring to FIG. 13, a SoC 1300 may include a plurality of masters 260a, a plurality of slaves 160a and a bus system 105a connected to the plurality of masters 260a and the plurality of slaves 160a. The SoC 1300e may be embodied in a chip that is included in a package.

The plurality of masters 260a may include a first master 20-1, a second master 20-2, a third master 20-3 and a fourth master 20-4. The plurality of slaves 160a may include a first slave 40-1, a second slave 40-2, a third slave 40-3 and a fourth slave 40-4. The number of masters and slaves is four for the sake of efficient explanation, however, the number of masters and slaves is not limited thereto.

The bus system 105a may include a priority controller 31 and a bus switch 33. The priority controller 31 may control the priority of interfacing among the plurality of masters 260a and the plurality of slaves 160a. The priority controller 31 may receive a plurality of bus requests for a read/write operation from the plurality of masters 260a and the plurality of slaves 160a and manage priorities of services to the bus requests.

The bus switch 33 may include a first slave interface 33-1 (SI1), a second slave interface 33-2 (SI2), a third slave interface 33-3 (SI3), a fourth slave interface 33-4 (SI4), a first master interface 33-5 (MI1), a second master interface 33-6 (MI2), a third master interface 33-7 (MI3) and a fourth master interface 33-8 (MI4).

The bus switch 33 may connect at least one of the plurality of masters 260a to at least one of the plurality of slaves 160a based on priority information generated by the priority controller 31 and a target address generated by one of the masters 260a. The bus switch 33 may connect a selected at least one of the plurality of masters 260a to a selected at least one of the plurality of slaves 160a through one of the slave interfaces 33-1 to 33-4 connected to the selected at least one of the plurality of masters 260a and one of the master interfaces 33-5 to 33-8 connected to the selected at least one of the plurality of slaves 160a. The bus switch 33 may support multiple masters to access multiple slaves simultaneously if there is no contention or conflict among the multiple masters and the multiple slaves.

The bus subsystem may be designed according to a AMBA3 or a AMBA4 protocol or a handshaking bus protocol.

According to the exemplary embodiment of the present inventive concept in FIG. 13, at least one of the connections (dot-lines in FIG. 13) between the masters 260a and the slaves 160a in the bus system 105a may an asynchronous long-hop channel. By providing the master MI_CLK and the slave clock SI_CLK described in FIGS. 9 and 12, the bus switch 33 may be designed efficient in view of circuit complexity, performance and power consumption as described in FIGS. 1 and 12.

Each of the masters 20-1 to 20-4 may be a microprocessor or a graphic processor embodied in the SoC 1300. The SoC 1300 may be an integrated circuit and may be embodied in various mobile devices such as a mobile phone, a smart phone, a tablet Personal Computer (PC), a Personal Digital Assistant (PDA), etc. The SoC 1300 may be embodied in an Information Technology (IT) device or a portable electronic device.

Figure 14:
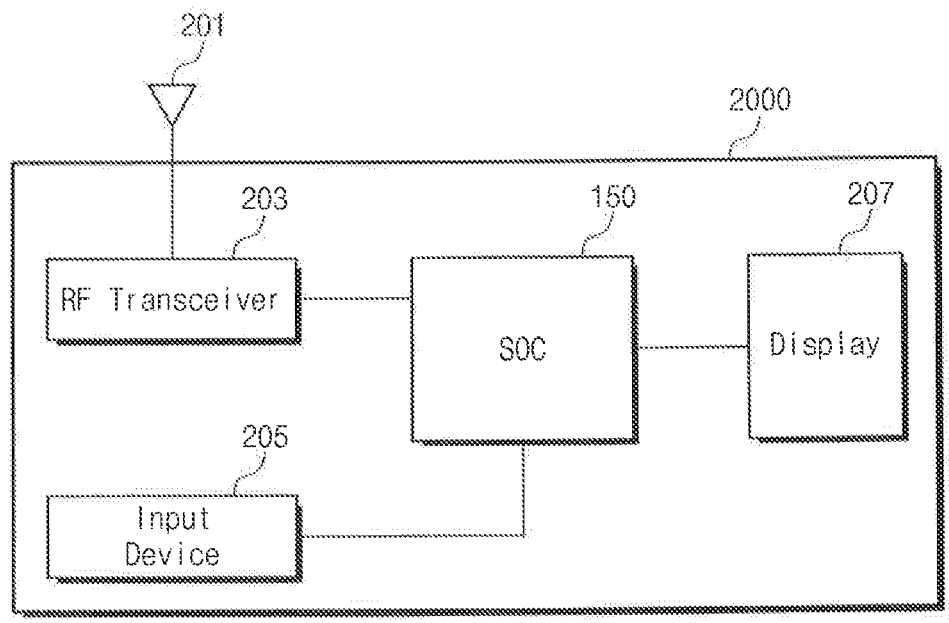
FIG. 14 is a block diagram of a data processing system including a SoC according to an exemplary embodiment of the present inventive concept.

FIG. 14 is a block diagram of a data processing system including a SoC according to an exemplary embodiment of the present inventive concept.

Referring to FIG. 14, a data processing system 2000 may include a SoC 150, an antenna 201, a radio frequency (RF) transceiver 203, an input device 205 and a display 207. The SoC 150 may be the SoC 150 shown in FIG. 1.

The RF transceiver 203 may receive and transmit a wireless signal through the antenna 201. The RF transceiver 203 may convert the received wireless signal into a signal that can be processed by the SoC 150.

The SoC 150 may process the signal outputted from the RF transceiver 203 and transfer the processed signal to the display 207. Further, the RF transceiver 203 may convert a signal generated by the SoC 150 into the wireless signal and transfer the wireless signal into an external device through the antenna 201.

The input device 205 that inputs data or control information to control the SoC 150 into the SoC 150 may be a pointing device such as a touch pad, a computer mouse, a keypad, or a keyboard.

The data processing system 2000 may include an asynchronous long-hop channel in the SoC 150 and can reduce design complexity and power consumption.

Figure 15:
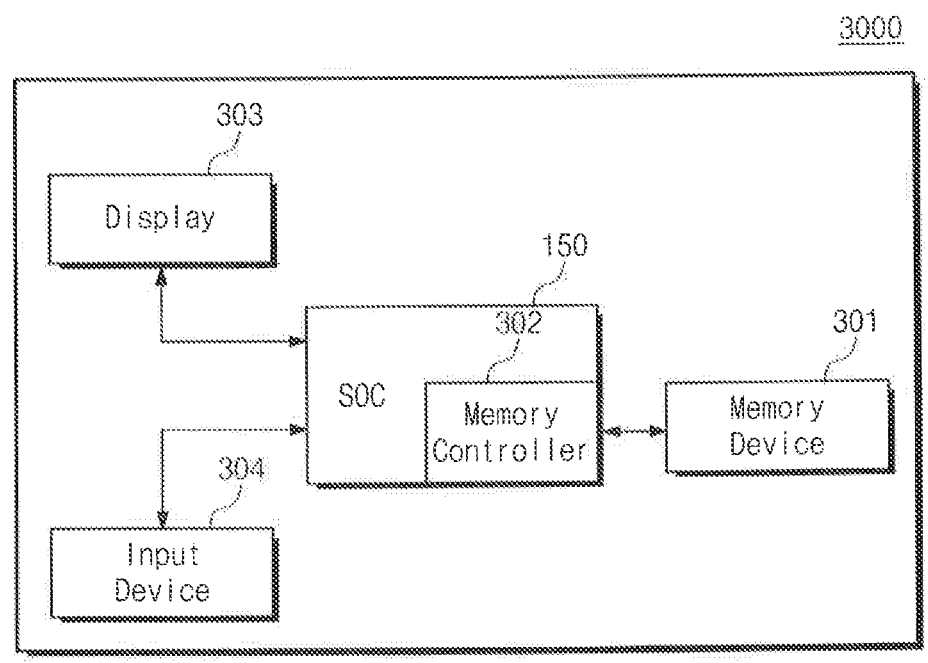
FIG. 15 is a block diagram of a data processing system including a SoC according to an exemplary embodiment of the present inventive concept.

FIG. 15 is a block diagram of a data processing system including a SoC according to an exemplary embodiment of the present inventive concept.

Referring to FIG. 15, a data processing system 3000 may be embodied in a PC, a network server, a tablet PC, a net-book, an e-reader, a PDA, a Portable multimedia player (PMP), a MP3 player or a MP4 player.

The data processing system 3000 may include a SoC 150, a memory component 301, a memory controller 302 to control data processing of the memory component 301, a display 303 and an input device 304.

The input device 304 may convert an input signal into data and transfer the data to the SoC 150 or the memory controller 302.

The SoC 150 may receive the data inputted from the input device 304. The data may be displayed or be stored in the memory component 301 under the control of the SoC 150. The data stored in the memory component 301 may be displayed by the display 303 under the control of the memory controller 302.

The SoC 150 may control the data processing system 3000 as a whole and manage the operation of the memory controller 302. The memory controller 302 may be embedded in the SoC 150 or be designed as a separate component.

According to the exemplary embodiments of the present inventive concept in FIGS. 1 to 13, the data processing system 3000 may include an asynchronous long-hop channel in the SoC 150 and can reduce design complexity and power consumption.

Figure 16:
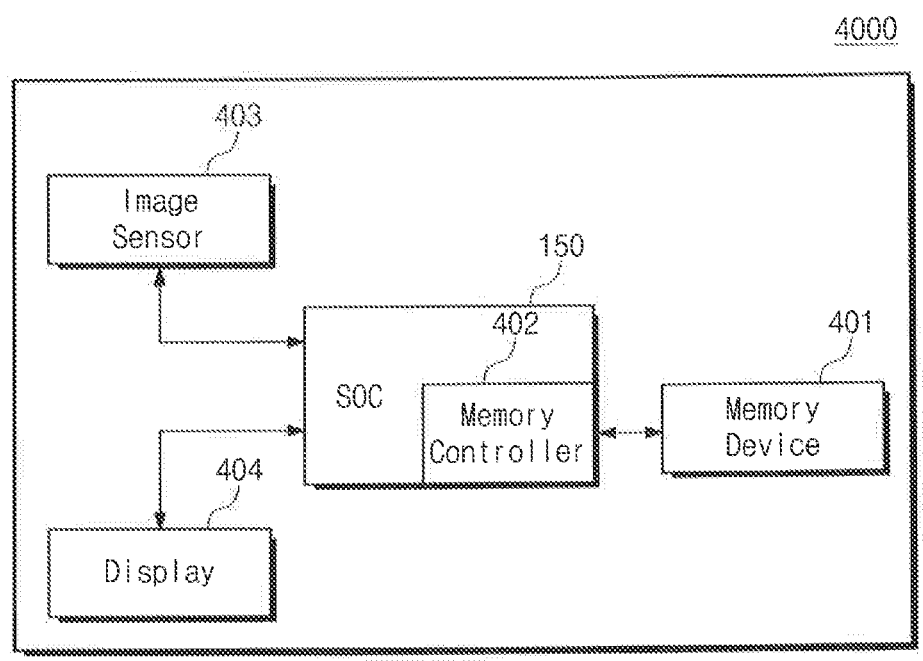
FIG. 16 is a block diagram of a data processing system including a SoC according to an exemplary embodiment of the present inventive concept.

FIG. 16 is a block diagram of a data processing system including a SoC according to an exemplary embodiment of the present inventive concept.

Referring to FIG. 16, a data processing system 4000 may be embodied in a image processing device, for example a digital camera, a mobile phone or a smart phone having a camera module.

The data processing system 4000 may include a SoC 150, a memory component 401, a memory controller 402 to control data processing of the memory component 401, a display 404 and an image sensor 403.

The image sensor 403 may convert optical image data into digital image data and transfer the digital image data to the SoC 150 or the memory controller 402.

The SoC 150 may receive the digital image data inputted from the image sensor 403. The digital image data may be displayed or be stored in the memory component 401 under the control of the SoC 150. The digital image data stored in the memory component 401 may be displayed by the display 404 under the control of the memory controller 402.

The SoC 150 may control the data processing system 4000 as a whole and manage the operation of the memory controller 402. The memory controller 402 may be embedded in the SoC 150 or be designed as a separate component.

According to the exemplary embodiments of the present inventive concept in FIGS. 1 to 13, the data processing system 4000 may include an asynchronous long-hop channel in the SoC 150 and can reduce design complexity and power consumption.

Figure 17:
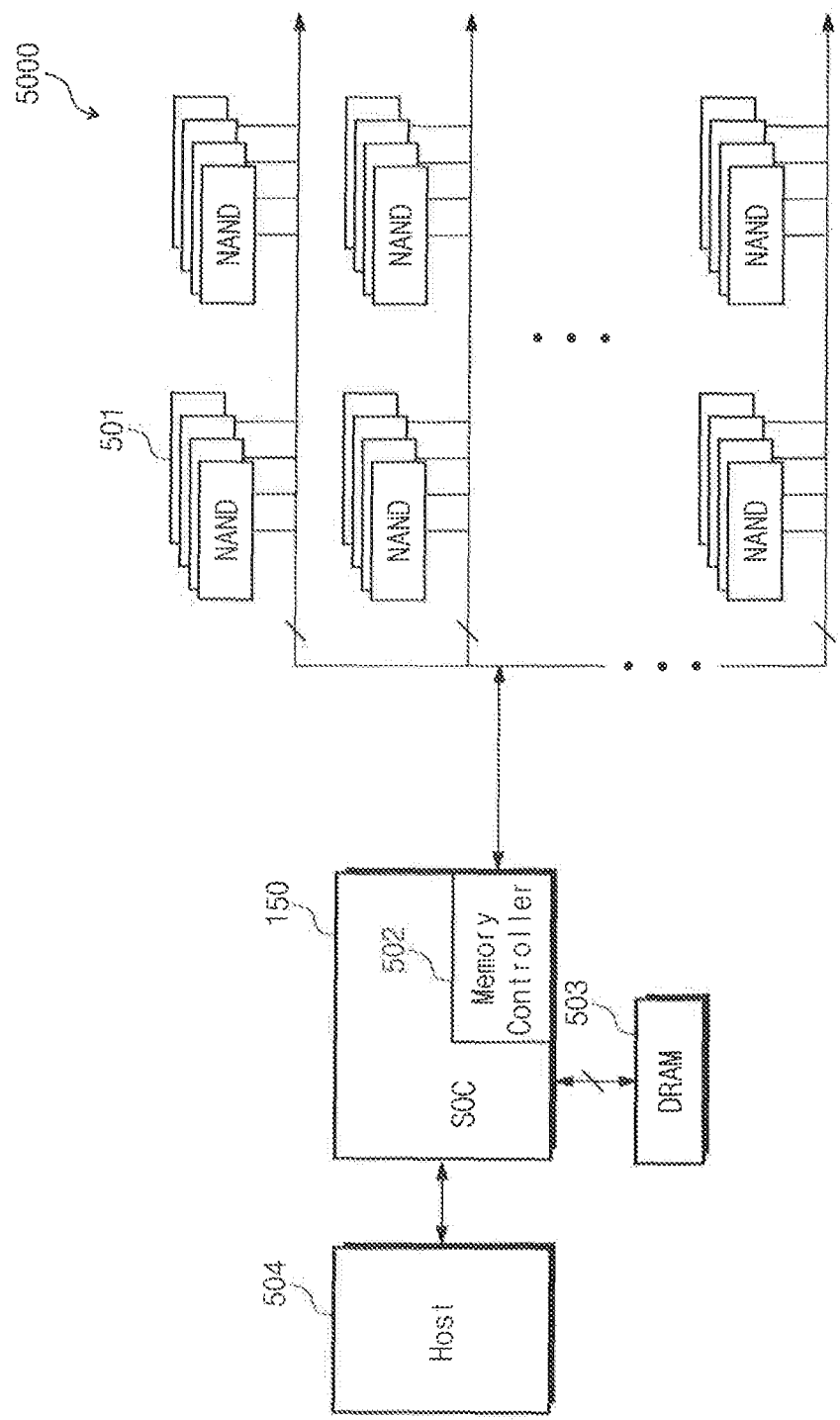
FIG. 17 is a block diagram of a computer system including a SoC according to an exemplary embodiment of the present inventive concept.

FIG. 17 is a block diagram of a computer system including a SoC according to an exemplary embodiment of the present inventive concept.

Referring to FIG. 17, a computer system 5000 may include a plurality of non-volatile memory components 501, a memory component 503, a memory controller 502 to control operations of the memory components 501 and the memory component 503, and a SoC 150 to store data processed by the memory components 501 and a host 504 in the volatile memory 503.

The plurality of non-volatile memory components 501 may be non-volatile memories such as NAND memory and NOR memory. The memory component 503 may include a volatile memory such as DRAM and SRAM, or a non-volatile memory such as magnetoresistive random access memory (MRAM).

The memory controller 502 may interface with an external device according to a communication protocol such as Universal Serial Bus (USB), multimedia card (MMC), peripheral component interconnection (PCI), PCI-express (PCI-E), Advanced Technology Attachment (ATA), Serial-ATA, Parallel-ATA, Small Computer System Interface (SCSI), Enhanced Small Disk Interface (ESDI), and Integrated Drive Electronics (IDE).

The plurality of non-volatile memory components 501 may be connected to the memory controller 502 through a plurality of memory channels. Each of the plurality of non-volatile memory components 501 may be embodied in NAND flash memory, an Electrically Erasable Programmable Read-Only Memory (EEPROM), an MRAM, a Spin-Transfer Torque MRAM, a Conductive Bridging RAM (CBRAM), a Ferroelectric RAM (FeRAM), a PRAM referred to as Ovonic Unified Memory (OUM), a Resistive RAM (RRAM or ReRAM), Nanotube RRAM, a Polymer RAM (PoRAM), a Nano Floating Gate Memory (NFGM), a holographic memory, a Molecular Electronics Memory Device, or an Insulator Resistance Change Memory.

Each of the plurality of non-volatile memory components 501 and the memory component 503 may be packaged in various types of packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline Package (TSOP), Thin Quad Flatpack (TQFP), System In Package (SIP), Multi Chip Package (MCP), Wafer-level Fabricated Package (WFP), Wafer-Level Processed Stack Package (WSP), etc.

According to the exemplary embodiments of the present inventive concept in FIGS. 1 to 13, the computer system 5000 may include an asynchronous long-hop channel in the SoC 150 and can reduce design complexity and power consumption.

The computer system 5000 may be embodied in an Ultra Mobile PC (UMPC), a workstation, a net-book, a PDA, a portable computer, a web tablet, a tablet computer, a cordless phone, a mobile phone, a smart phone, a e-book, a PMP, a portable game player, a navigation system, a black box, a digital camera, a Digital Multimedia Broadcasting (DMB) player, a three-dimensional television, a digital audio recorder, a digital audio player, a digital picture recorder, a digital picture player, a digital video recorder, a digital video player, a storage medium for a data center, a wireless transceiver/receiver system, one of various electronic devices or components for home networking, a computer network, a telematics network, a radio frequency identification (RFID) device, a computing system, etc.

Although the present inventive concept has been described with reference to exemplary embodiments thereof, it will be understood by those of ordinary skill in the art that various changes in forms and details may be made thereto without departing from the spirit and scope of the present inventive concept as defined by the following claims.

What is claimed is:

1. A bus interfacing method of a system on chip, comprising:
   transmitting a payload from a first interface to a buffer memory in a second interface at a first transfer rate through a first channel in synchronization with a first clock signal;
   transmitting the payload from the buffer memory to a payload receiver at a second transfer rate through a second channel that is asynchronous with the first channel, wherein the first channel has a larger length than the second channel;

transmitting an enable signal of the payload from the first interface to the second interface at the first transfer rate through the first channel in synchronization with the first clock signal; and transmitting a second clock signal and an acknowledge signal in synchronization with the second clock signal at the second transfer rate from the second interface to the first interface through a third channel, wherein the buffer memory is a first in first out (FIFO) memory.

2. The bus interfacing method of a system on chip of claim 1, wherein the bus interfacing is performed based on an Advanced eXtensible Interface (AXI) bus protocol.

3. The bus interfacing method of a system on chip of claim 2, wherein when a frequency of the first clock is equal to or larger than 500 Mhz, a length of the first channel is greater than 2000 μm.

4. The bus interfacing method of a system on chip of claim 1, wherein the second channel is included in the second interface.

5. The bus interfacing method of a system on chip of claim 1, wherein the first channel is a long-hop channel.

6. A bus interfacing circuit, comprising:
a transmitter interface configured to transmit a payload, a write enable signal and a transmitter clock signal through a first channel; and
a receiver interface comprising:
a first in first out (FIFO) memory configured to store the payload based on a remote write pointer generated by the receiver interface based on the write enable signal; and
a payload receiver configured to read the payload from the FIFO memory, wherein the receiver interface transmits a receiver clock and an acknowledge signal through a second channel, and a length of the second channel corresponds to a length of the first channel.

7. The bus interfacing circuit of claim 6, wherein the payload is transmitted from a memory component to the transmitter interface.

8. The bus interfacing circuit of claim 7, wherein the payload receiver is connected to a memory controller that is configured to control the memory component.

9. The bus interfacing circuit of claim 8, wherein the payload is latched and transmitted to the receiver interface in synchronization with the transmitter clock signal.

10. The bus interfacing circuit of claim 9, wherein the payload is stored in the FIFO memory in synchronization with the transmitter clock signal.

11. A bus interfacing circuit, comprising:
a transmitter interface configured to transmit a payload, a write enable signal and a transmitter clock signal through a first channel; and
a receiver interface comprising:
a memory configured to store the payload based on a remote write pointer generated by the receiver interface based on the write enable signal; and
a payload receiver configured to read the payload from the memory,
wherein the receiver interface transmits a receiver clock and an acknowledge signal through the first channel connected to the transmitter interface.

12. The bus interfacing circuit of claim 11, wherein the first channel is included in a long-hop channel.

13. The bus interfacing circuit of claim 11, wherein the memory is a first in first out memory.

* * * * *